(12) United States Patent
Norris et al.

(10) Patent No.: US 10,310,208 B2
(45) Date of Patent: Jun. 4, 2019

(54) FIBER OPTIC CABLE SUB-ASSEMBLIES AND METHODS OF MAKING

(71) Applicant: CORNING OPTICAL COMMUNICATIONS LLC, Hickory, NC (US)

(72) Inventors: Martin Eugene Norris, Lenoir, NC (US); Thomas Theuerkorn, Hickory, NC (US)

(73) Assignee: Cable Corning Systems LLC, Hickory, NC (US)

(*) Notice: Subject to any disclaimer, the term of this patent is extended or adjusted under 35 U.S.C. 154(b) by 69 days.

(21) Appl. No.: 13/756,912

(22) Filed: Feb. 1, 2013

(65) Prior Publication Data

US 2013/0209043 A1 Aug. 15, 2013

Related U.S. Application Data

(60) Provisional application No. 61/598,080, filed on Feb. 13, 2012.

(51) Int. Cl.
*G02B 6/42* (2006.01)
*G02B 6/44* (2006.01)
*G02B 6/38* (2006.01)

(52) U.S. Cl.
CPC ......... *G02B 6/4471* (2013.01); *G02B 6/3887* (2013.01); *G02B 6/4284* (2013.01);
(Continued)

(58) Field of Classification Search
CPC .................................................. G02B 6/4487
See application file for complete search history.

(56) References Cited

U.S. PATENT DOCUMENTS

| 4,447,120 A | * | 5/1984 | Borsuk | ................ G02B 6/4471 385/136 |
| 5,159,651 A | | 10/1992 | Gandy | ........................... 385/56 |

(Continued)

FOREIGN PATENT DOCUMENTS

| CN | 101317112 A | 12/2008 |
| FR | 2863367 A1 | 6/2005 |

(Continued)

OTHER PUBLICATIONS

Patent Cooperation Treaty, International Search Report and Written Opinion for International Application No. PCT/US2013/024282; dated May 7, 2013—11 pages.

(Continued)

*Primary Examiner* — Chris H Chu
(74) *Attorney, Agent, or Firm* — Michael E. Carroll, Jr.

(57) ABSTRACT

Fiber optic cable sub-assemblies comprise a fiber optic cable including at least one optical fiber, a cable jacket that houses the optical fiber and at least one strength member. The fiber optic cable sub-assembly further comprises a collar including an inner portion seated within a cavity of an outer portion, wherein the inner portion is attached to an end portion of the strength member of the cable, and the optical fiber extends through the collar to protrude from an outer axial end of the collar. Methods of assembling a fiber optic cable sub-assembly include providing a cable having a strength member along with a collar having an inner portion and an outer portion, attaching the inner portion to an end portion of the strength member so the optical fiber extends from an outer axial end of the collar along with methods for making cable assemblies.

19 Claims, 15 Drawing Sheets

(52) U.S. Cl.
CPC .......... *G02B 6/4479* (2013.01); *G02B 6/4214* (2013.01); *G02B 6/4477* (2013.01); *Y10T 29/49826* (2015.01)

(56) References Cited

U.S. PATENT DOCUMENTS

| | | | |
|---|---|---|---|
| 5,278,928 A | 1/1994 | Ueda et al. ............... 385/78 |
| 5,732,175 A | 3/1998 | Fan .......................... 385/87 |
| 5,751,875 A | 5/1998 | Edwards et al. .......... 385/84 |
| 5,815,618 A | 9/1998 | Takahashi et al. ........ 385/60 |
| 5,923,804 A | 7/1999 | Rosson ..................... 385/81 |
| 5,993,070 A | 11/1999 | Tamekuni et al. ........ 385/65 |
| 6,030,129 A | 2/2000 | Rosson ..................... 385/81 |
| 6,035,090 A * | 3/2000 | Kawaguchi et al. ...... 385/139 |
| 6,095,695 A | 8/2000 | Ohtsuka et al. .......... 385/72 |
| 6,193,421 B1 | 2/2001 | Tamekuni et al. ........ 385/65 |
| 6,276,843 B1 | 8/2001 | Alcock et al. ............ 385/90 |
| 6,305,849 B1 | 10/2001 | Roehrs et al. ............ 385/59 |
| 6,497,518 B1 | 12/2002 | Deane ....................... 385/92 |
| 6,517,254 B1 | 2/2003 | Hata et al. ................ 385/69 |
| 6,518,506 B2 | 2/2003 | Zink et al. ................ 174/138 |
| 6,588,947 B2 | 7/2003 | Mine et al. ............... 385/92 |
| 6,595,697 B2 | 7/2003 | Hirabayahi et al. ...... 385/78 |
| 6,604,865 B2 | 8/2003 | Bruland et al. ........... 385/78 |
| 6,672,774 B2 | 1/2004 | Theuerkorn et al. ..... 385/86 |
| 6,754,430 B1 | 6/2004 | Kuehne ..................... 385/138 |
| 6,769,814 B2 | 8/2004 | Kiani et al. ............... 385/78 |
| 6,848,834 B1 | 2/2005 | Roehrs et al. ............ 385/59 |
| 7,008,118 B2 | 3/2006 | Yoshitani et al. ......... 385/78 |
| 7,011,454 B2 | 3/2006 | Caveney et al. .......... 385/87 |
| 7,084,448 B2 | 5/2006 | Rosenberg et al. ....... 385/60 |
| 7,113,679 B2 | 9/2006 | Melton et al. ............. 385/113 |
| 7,149,392 B2 | 12/2006 | Chen et al. ............... 385/100 |
| 7,204,016 B2 | 4/2007 | Roth et al. ................ 29/749 |
| 7,264,402 B2 | 9/2007 | Theuerkorn et al. ..... 385/59 |
| 7,318,677 B2 | 1/2008 | Dye .......................... 385/78 |
| 7,341,382 B2 | 3/2008 | Dye .......................... 385/78 |
| 7,369,738 B2 | 5/2008 | Larson et al. ............. 385/134 |
| 7,373,031 B2 | 5/2008 | Wang et al. ............... 285/14 |
| 7,431,513 B2 | 10/2008 | Sezerman et al. ........ 385/53 |
| 7,467,896 B2 | 12/2008 | Melton et al. ............. 385/87 |
| 7,507,031 B2 | 3/2009 | Kawasaki ................. 385/72 |
| 7,585,116 B2 | 9/2009 | Cull et al. ................. 385/60 |
| 7,621,676 B2 | 11/2009 | Nakagawa et al. ....... 385/81 |
| 7,654,747 B2 | 2/2010 | Theuerkorn et al. ..... 385/59 |
| 7,661,886 B2 | 2/2010 | Wang et al. ............... 385/55 |
| 7,722,262 B2 | 5/2010 | Caveney et al. .......... 385/78 |
| 7,775,725 B2 | 8/2010 | Grinderslev .............. 385/74 |
| 7,775,726 B2 | 8/2010 | Pepin et al. ............... 385/78 |
| 7,785,015 B2 | 8/2010 | Melton et al. ............. 385/59 |
| 7,785,019 B2 | 8/2010 | Lewallen et al. .......... 385/75 |
| 7,787,614 B2 | 8/2010 | Duran et al. |
| 7,857,662 B2 | 12/2010 | Gillespie et al. .......... 439/607.3 |
| 7,869,685 B2 | 1/2011 | Hendrickson et al. .... 385/139 |
| 7,881,576 B2 | 2/2011 | Melton et al. ............. 385/103 |
| 7,918,609 B2 | 4/2011 | Melton et al. ............. 385/59 |
| 7,993,064 B2 | 8/2011 | Shaddock et al. ........ 385/92 |
| 8,038,356 B2 | 10/2011 | Marcouiller et al. ..... 385/78 |
| 8,118,494 B2 | 2/2012 | Larson et al. ............. 385/60 |
| 8,942,528 B2 | 1/2015 | Theuerkorn et al. |
| 2002/0186931 A1 | 12/2002 | Seo et al. .................. 385/60 |
| 2002/0197022 A1 | 12/2002 | Mine et al. ............... 385/88 |
| 2003/0044125 A1 | 3/2003 | Kiani et al. ............... 385/78 |
| 2003/0059173 A1 | 3/2003 | Trezza et al. ............. 385/89 |
| 2003/0068139 A1 | 4/2003 | Theuerkorn et al. ..... 385/86 |
| 2003/0091297 A1 | 5/2003 | Hung et al. ............... 385/83 |
| 2004/0042736 A1* | 3/2004 | Capewell et al. ......... 385/89 |
| 2004/0247255 A1 | 12/2004 | Rosenberg et al. ....... 385/78 |
| 2005/0036744 A1 | 2/2005 | Caveney et al. .......... 385/87 |
| 2006/0045429 A1 | 3/2006 | Chen et al. ............... 385/53 |
| 2006/0067631 A1 | 3/2006 | Wang et al. ............... 385/92 |
| 2007/0053637 A1 | 3/2007 | Golwalkar et al. ....... 385/88 |
| 2007/0110384 A1* | 5/2007 | Cody et al. ............... 385/134 |
| 2007/0297723 A1 | 12/2007 | Flower et al. ............. 385/71 |
| 2008/0095504 A1 | 4/2008 | Kawasaki ................. 385/84 |
| 2008/0175547 A1 | 7/2008 | Wang et al. ............... 385/92 |
| 2008/0220658 A1* | 9/2008 | Caveney et al. .......... 439/676 |
| 2008/0226236 A1 | 9/2008 | Pepin et al. ............... 385/81 |
| 2008/0279508 A1 | 11/2008 | Fukui et al. ............... 385/72 |
| 2009/0022457 A1 | 1/2009 | De Jong et al. ........... 385/96 |
| 2009/0060420 A1 | 3/2009 | Cull et al. ................. 385/62 |
| 2009/0304335 A1 | 12/2009 | Marcoullier et al. ..... 385/78 |
| 2010/0003002 A1 | 1/2010 | Benard et al. ............. 385/139 |
| 2010/0086260 A1 | 4/2010 | Parikh et al. ............. 385/76 |
| 2010/0098381 A1 | 4/2010 | Larson et al. ............. 385/60 |
| 2010/0220962 A1 | 9/2010 | Caveney et al. .......... 385/78 |
| 2010/0310213 A1 | 12/2010 | Lewallen et al. .......... 385/75 |
| 2010/0322563 A1 | 12/2010 | Melton et al. ............. 385/59 |
| 2011/0044588 A1 | 2/2011 | Larson et al. ............. 385/81 |
| 2011/0103749 A1 | 5/2011 | Hogue ...................... 385/81 |
| 2011/0206335 A1 | 8/2011 | Cook ........................ 385/135 |
| 2011/0235977 A1 | 9/2011 | Yamada .................... 385/76 |
| 2011/0268390 A1 | 11/2011 | Yi et al. |
| 2012/0027345 A1* | 2/2012 | Castagna et al. ......... 385/33 |
| 2012/0027360 A1 | 2/2012 | Larson et al. ............. 385/78 |
| 2012/0121222 A1 | 5/2012 | Castonguay et al. ..... 385/78 |
| 2012/0141070 A1 | 6/2012 | Sabo ......................... 385/60 |
| 2012/0281952 A1 | 11/2012 | McColloch ............... 385/93 |
| 2012/0328248 A1 | 12/2012 | Larson et al. ............. 385/81 |
| 2013/0004127 A1 | 1/2013 | McColloch ............... 385/78 |
| 2013/0177283 A1 | 7/2013 | Theuerkorn et al. |

FOREIGN PATENT DOCUMENTS

| | | |
|---|---|---|
| GB | 2026200 A | 1/1980 |
| GB | 2054191 A | 2/1981 |

OTHER PUBLICATIONS

Chinese Search Report for corresponding CN Appln. No. 2013800118666, dated May 13, 2015.

* cited by examiner

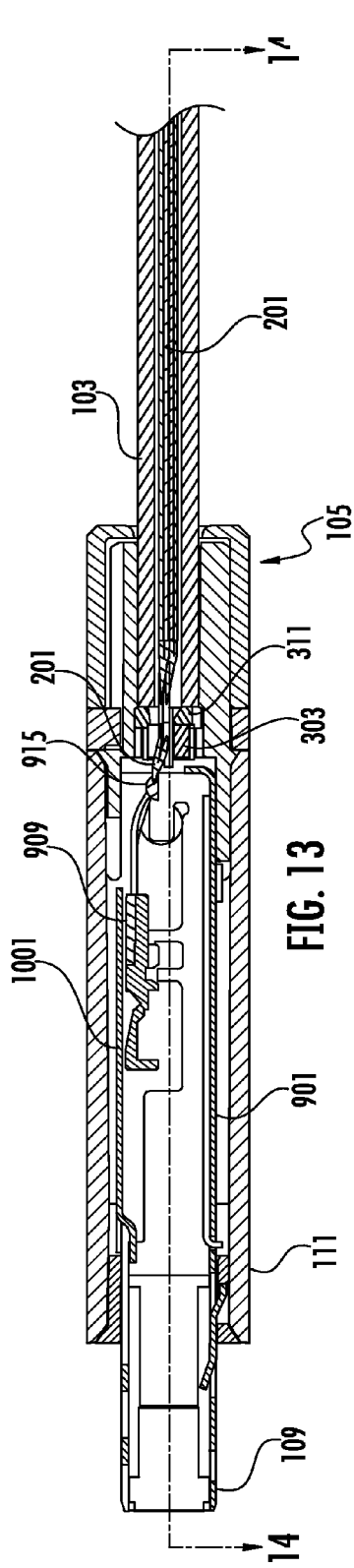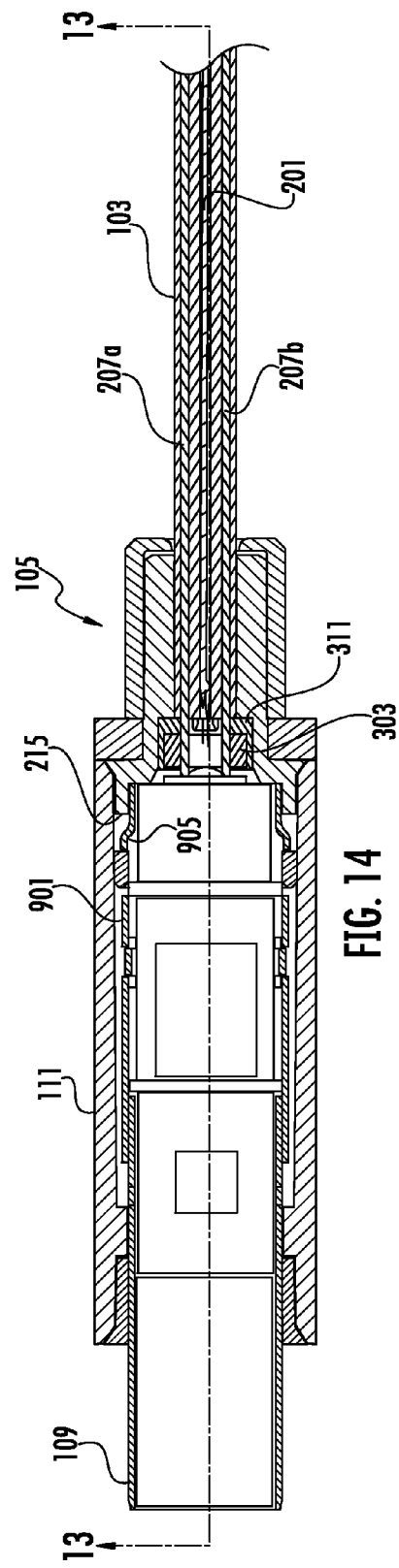

FIBER OPTIC CABLE SUB-ASSEMBLIES AND METHODS OF MAKING

CROSS REFERENCE TO RELATED APPLICATIONS

This application claims the benefit of priority under 35 U.S.C. § 119 of U.S. Provisional Application Ser. No. 61/598,080 filed on Feb. 13, 2012, the contents of which is relied upon and incorporated herein by reference in its entirety.

BACKGROUND

Field

The present disclosure relates generally to fiber optic cable sub-assemblies and methods of assembling and, more particularly, to fiber optic cable sub-assemblies including a collar with an inner portion attached to an end portion of a fiber optic cable such as a strength member and methods of assembling a fiber optic cable sub-assembly.

Technical Background

Conventional fiber optic cable configurations are known to employ aramid yarns, fiberglass yarns or glass-reinforced plastic rods as the main strength members of the cable. One or more connectors may be attached to an end of the fiber optic cable to form an optical cable assembly (i.e., a fiber optic cable attached to a connector). When creating the optical cable assembly, care must be taken to preserve excess optical fiber length in the cable to avoid axial load that may cause undesired deformation resulting in tension of the fiber and potential attenuation and/or physical harm to the cable assembly such as pulling the optical fibers form the ferrule.

SUMMARY

In one example aspect, a fiber optic cable sub-assembly comprises a fiber optic cable including at least one optical fiber, a cable jacket that houses the optical fiber and at least one strength member. The fiber optic cable sub-assembly further comprises a collar including an inner portion seated within a cavity of an outer portion, wherein the inner portion is attached to an end portion of the strength member, and wherein the optical fiber extends through the collar to protrude from an outer axial end of the collar.

In another example aspect, a fiber optic cable assembly comprises a fiber optic cable including at least one optical fiber, a cable jacket that houses the optical fiber and at least one strength member. The fiber optic cable is a portion of a first fiber optic sub-assembly including a first collar with a first inner portion seated within a cavity of a first outer portion. The first inner portion is attached to a first end portion of the strength member. A first end portion of the optical fiber extends through the first collar to protrude from an outer axial end of the first collar. A first connector housing is attached to the first collar, and a first interface operably connects the first end portion of the optical fiber to a first active component within the first connector housing. Other variations can include a similar sub-assembly or connector on the other end of the fiber optic cable.

In a further example aspect, a method of assembling a fiber optic cable sub-assembly includes providing a fiber optic cable with at least one optical fiber and a cable jacket that houses the optical fiber and at least one metal strength member, providing a first collar including a first inner portion seated within a first outer portion, and attaching the first inner portion to a first end portion of the metal strength member. A first end portion of the optical fiber extends through the first collar to protrude from an outer axial end of the first collar. The method may include other steps as disclosed herein such as attaching the optical fibers to an interface such as a total internal reflection block or attaching the collar to a connector housing.

Additional features and advantages will be set forth in the detailed description which follows, and in part will be readily apparent to those skilled in the art from the description or recognized by practicing the embodiments as described in the written description and claims hereof, as well as the appended drawings. It is to be understood that both the foregoing general description and the following detailed description are merely exemplary, and are intended to provide an overview or framework to understand the nature and character of the claims. The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

These and other features, aspects and advantages of the present disclosure are better understood when the following detailed description is read with reference to the accompanying drawings, in which:

FIG. 13 is a cross-sectional view of assembled portions of the fiber optic cable assembly of FIG. 12 along line 13-13 of FIG. 14;

FIG. 14 is a cross-sectional view of assembled portions of the fiber optic cable assembly of FIG. 12 along line 14-14 of FIG. 13;

DETAILED DESCRIPTION

Figure 1:
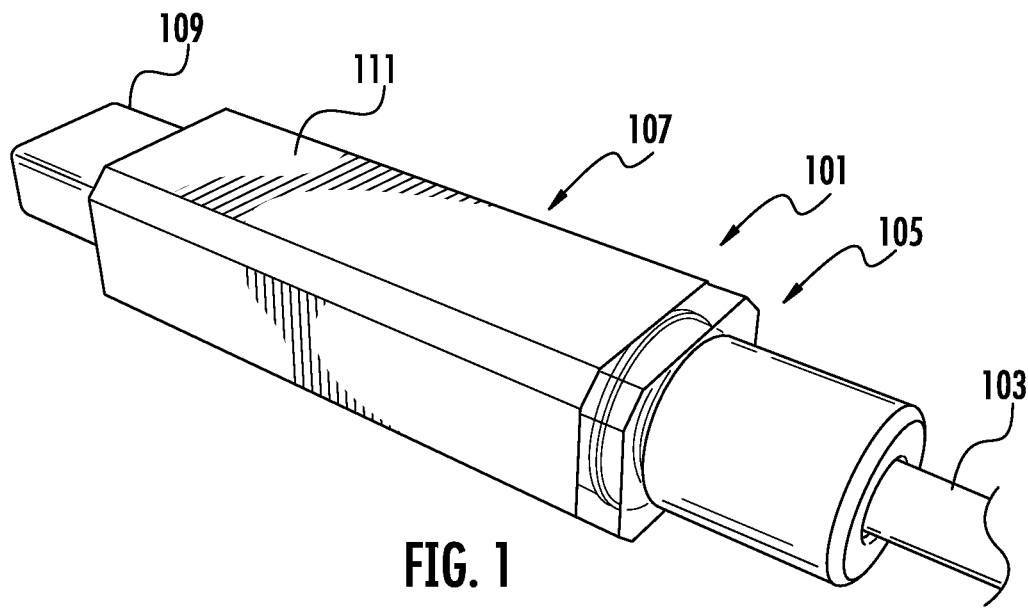
FIG. 1 is a perspective view of an example assembled optical cable assembly.

The present disclosure will now be described more fully hereinafter with reference to the accompanying drawings in which example embodiments are shown. Whenever possible, the same reference numerals are used throughout the drawings to refer to the same or like parts. However, these concepts may be embodied in many different forms and should not be construed as limited to the embodiments set forth herein. These example embodiments are provided so that this disclosure will be both thorough and complete, and will fully convey the scope of the disclosure to those skilled in the art.

Disclosed are structures and methods for attaching a cable to a collar for making sub-assemblies useful for cable assemblies. Although the concepts disclosed are described and illustrated with respect to active optic cable assemblies and associated sub-assemblies, the concepts may be used with any suitable type of sub-assembly or cable assembly such as a passive optical cable assembly or electrical cable assembly as desired. For instance, a passive optical cable assembly has a cable with optical fibers attached to a portion of the connector with an optical interface that may include electrical connections as desired. On the other hand, the active optical cable assembly converts an inputted electrical signal at the connector interface to an optical signal (i.e., electrical-to-optical conversion) for transmission along the optical fibers of the cable and then converts the transmitted optical signal back to an electrical signal (i.e., optical-to-electrical conversion) at the output side. As such, the active optical cable assembly may include one or more active electrical/optical components such as integrated chips, photodiodes, vertical cavity surface emitting laser (VCSEL) and/or other components at or near the connector for converting optical signals to electrical signals and vice versa. The photodiodes and VCSELs may be aligned with an interface such as total internal reflection (TIR) block, ferrule, lead frame or other structure for aligning the optical signals with the desired active components. In other words, the TIR block, leadframe, ferrule or the like receive and are attached to one or more optical fibers so the optical signals may be transmitted to/from photodiodes and VCSELs.

Figure 2:
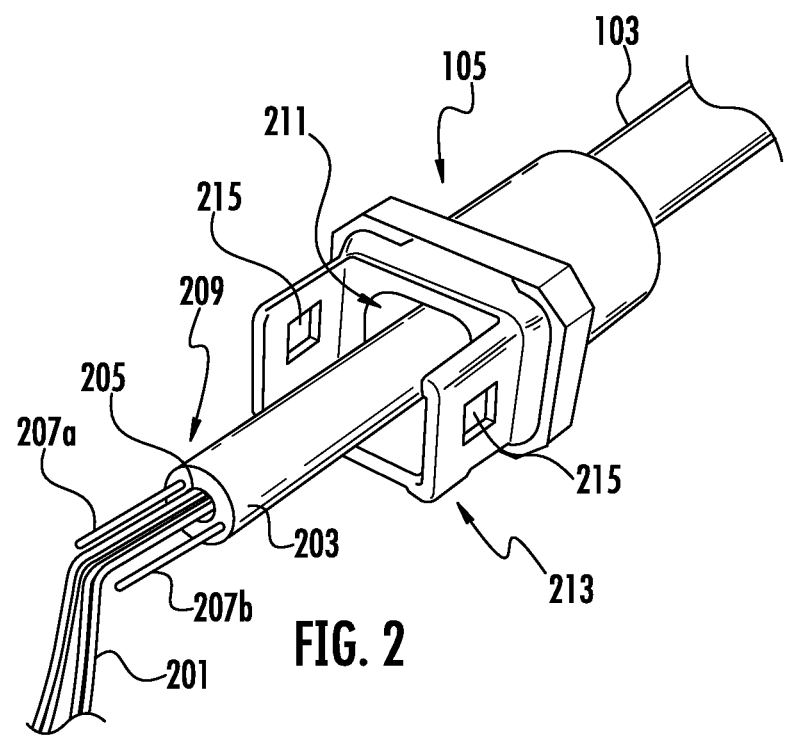
FIG. 2 is a perspective view of an example step of inserting a cable boot over an end of a fiber optic cable when assembling the optical cable sub-assembly.

By way of explanation, FIG. 1 shows an assembled optical cable assembly 101 that includes optical fibers that transmit optical signals along the cable and that are converted to electrical signals within the connector; however, the concepts of the sub-assembly for attaching the cable to the collar may be used with passive optical cable assemblies or the like in further examples. Example components of the optical cable assembly 101 and methods of assembling the optical cable assembly 101 can be understood with reference to FIGS. 2-11. As shown in FIGS. 1 and 2 the optical cable assembly 101 includes a fiber optic cable 103. As shown in FIG. 2, the fiber optic cable 103 includes at least one optical fiber 201, such as the illustrated plurality of optical fibers. The one or more optical fibers 201 may transmit light across a fiber length between opposed ends of the optical cable assembly 101.

Each optical fiber 201 may be individually protected by a protective coating applied to individual strands of optical fiber or bundles of optical fibers such as a upcoating such as a polymer or UV curable buffer layer on the fiber or a matrix on an array of fibers to form a ribbon. In addition or alternatively, the fiber optic cable can include a cable jacket 203 that houses the optical fiber(s). The cable jacket 203 can further help protect the optical fibers housed within the cable jacket 203 for external environmental conditions. For example, the cable jacket 203 may comprise rubber, plastic or other suitable materials resistant to moisture, environmental forces acting on the optical cable assembly or other environmental conditions.

Moreover, as shown, the cable jacket 203 may include an internal passage 205 freely receiving the optical fibers 201 therethrough although the optical fibers may be encapsulated within the cable jacket in further examples. Providing the internal passage 205 for freely receiving the optical fibers 201 can allow the cable jacket 203 to act as a conduit to allow free passage of optical fibers through the cable jacket 203 (e.g., movement of the optical fibers during cable bending, etc.). As such, in some examples, the cable jacket 203 may be provided with a single or a plurality of optical fibers within the internal passage depending on the particular application, but other suitable cable designs are possible with the concepts disclosed such as having the optical fibers in a further tube or other fiber envelope. Additionally, other cables may include electrical conductors or other suitable components as desired.

The cable jacket 203 can also help prevent undesired bending of the optical fibers 201 and/or undesired axial loading of the optical fibers 201. Preventing undesired bending can help the optical fibers 201 maintain a minimum bend radius and can help reduce stress experienced by the optical fiber and/or help maintain optimum transmission of light through the optical fibers 201. Moreover, placing the optical cable assembly 101 under undue tension or compression can be absorbed by the cable jacket 203 without being transmitted to the relatively delicate optical fibers 201 housed within the cable jacket 203. The structural configuration of the cable jacket 203 may allow the cable jacket to resist axial loading and/or undesired bending. For instance, the outer shape of the cable jacket and/or the internal passage may be designed to resist bending moments. For instance, the internal passage may have a generally rectangular shape that is arranged with respect to a preferential bend characteristic of the cable based on the location of other elements of the cable such as strength members.

In further examples, cable jacket and/or cable may be provided with at least one metal strength member, such as the illustrated elongated metal strength member, extending along a length, such as substantially the entire length of the cable jacket 203. The metal strength member may comprise a substantially continuous member extending from a first end of the cable jacket to the second end of the cable jacket. Although discontinuous metal strength members may be provided along a portion of the entire length of the cable jacket, providing a continuous member extending from the first end to the second end of the cable jacket can help maintain a certain level of flexibility but resist and undesired bending radius and/or axial loading of the optical cable assembly 101. Moreover, forming the strength members from metal can still further help maximize the strength of the cable jacket. Metal can comprise steel (e.g., stainless steel), copper, stranded metal wire, stainless steel stranded wire or other types of metal. Of course, cables can use non-metal strength members such as glass-reinforced plastics (GRPs) and still use the concepts disclosed herein.

As shown in FIG. 2, the at least one metal strength member comprises a first metal strength member 207a and a second metal strength member 207b. Although two metal strength members are illustrated, in further examples, one or more than two metal strength members may be provided. Furthermore, as shown, the first and second metal strength members 207a, 207b may optionally be symmetrically positioned at opposite sides of the internal passage 205 to help evenly fortify the internal passage containing the optical fibers 201. As still further illustrated in FIG. 2, the metal strength members 207a, 207b may be optionally at least partially encapsulated within cable jacket 203 although the metal strength members may extend exterior to the cable jacket or within the internal passage 205 in further examples. At least partially encapsulating the metal strength members within the cable jacket can help protect the metal strength members from corrosion and can also further strengthen the cable member due to the composite nature of the metal strength member and cable jacket.

As shown in FIGS. 1 and 2 the optical cable assembly can further include an optional cable boot 105 that may be provided to help guide and attach an end portion 209 of the fiber optic cable 103 to the connector housing 107. As shown in FIG. 2, if provided, the cable boot 105 can include a receptacle 211 that may be configured to receive a collar 301 discussed more fully below. The boot may also include structure configured to attach the collar 301 to the connector housing 107. For example, the cable boot 105 may include a snap bracket 213 including windows 215 configured to receive snapping members from the connector housing 107 discussed more fully below. If provided with the optional cable boot 105, as shown in FIG. 2, the assembly process may begin by threading the end portion 209 of the fiber optic cable 103 through a cable passage within the cable boot 105 and out through the receptacle 211.

Figure 3:
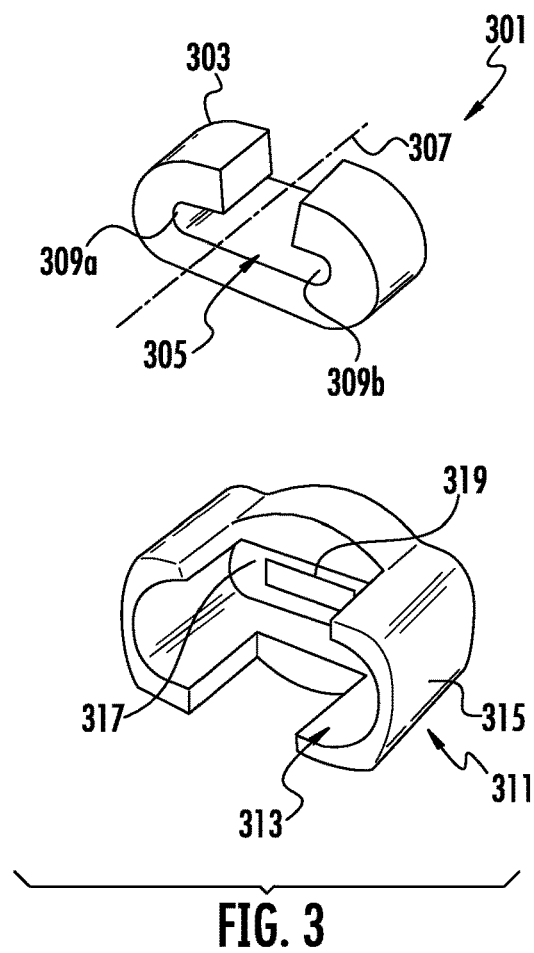
FIG. 3 is an exploded perspective view of an explanatory collar having an inner portion and an outer portion.
Figure 4:
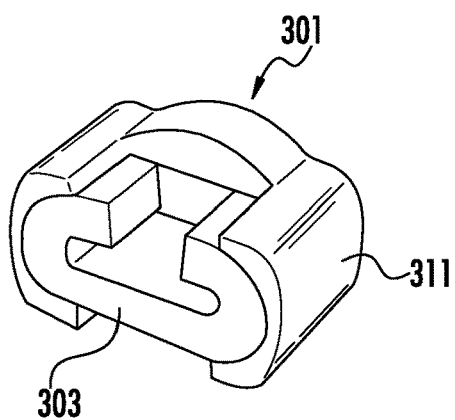
FIG. 4 is an assembled perspective view of the collar of FIG. 3 with the inner portion being seated within the outer portion.

As mentioned previously, the optical cable assembly includes a collar, for example, as illustrated in FIGS. 3 and 4. The collar 301 includes an inner portion 303 configured to be attached, such as rigidly attached, to end portions of the at least one metal strength member. The inner portion 303 may optionally be formed from a conductive material although nonconductive materials may be used in further examples. In one example, the inner portion 303 of the collar 301 defines an axial slot 305 extending along an insertion axis 307 of the inner portion 303. In this embodiment, the axial slot 305 is configured as an oblong axial slot, but the axial slot 305 can have any suitable shape. The axial slot 305 includes opposite radial end portions 309a, 309b that may be particularly beneficial to receive each metal strength member 207a, 207b. For example, as shown in FIGS. 5 and 6, each metal strength member 207a, 207b of fiber optic cable 103 passes through the axial slot 305 of inner portion 303 and is disposed, such as seated, within a respective one of the opposite radial end portions 309a, 309b of the axial slot 305.

Rigid attachment of the inner portion 303 to the at least one metal strength member can be achieved in a wide range of ways. For example, rigid attachment can be achieved with integral attachment, for example, by welding the ends of the metal strength members 207a, 207b to the inner portion 303. In further examples, rigid attachment of the strength members of the cable can be achieved by set screws, clamping members, gluing or other attachments procedures. In further examples, the inner portion of the collar may be crimped to the end portion of the at least one metal strength member by deforming the inner portion. For example, as shown in FIG. 5, the inner portion 303 may be crimped to the end portions of the metal strength members 207a, 207b, for example, by application of opposite pairs of force vectors 501a, 501b to deform end portions of the inner portion 303 to form a crimped attachment that may rigidly and fixedly grip the end portions of the metal strength members 209a, 209b. Consequently, fiber optic cable 103 is attached to the inner portion 303 of the collar.

Figure 5:
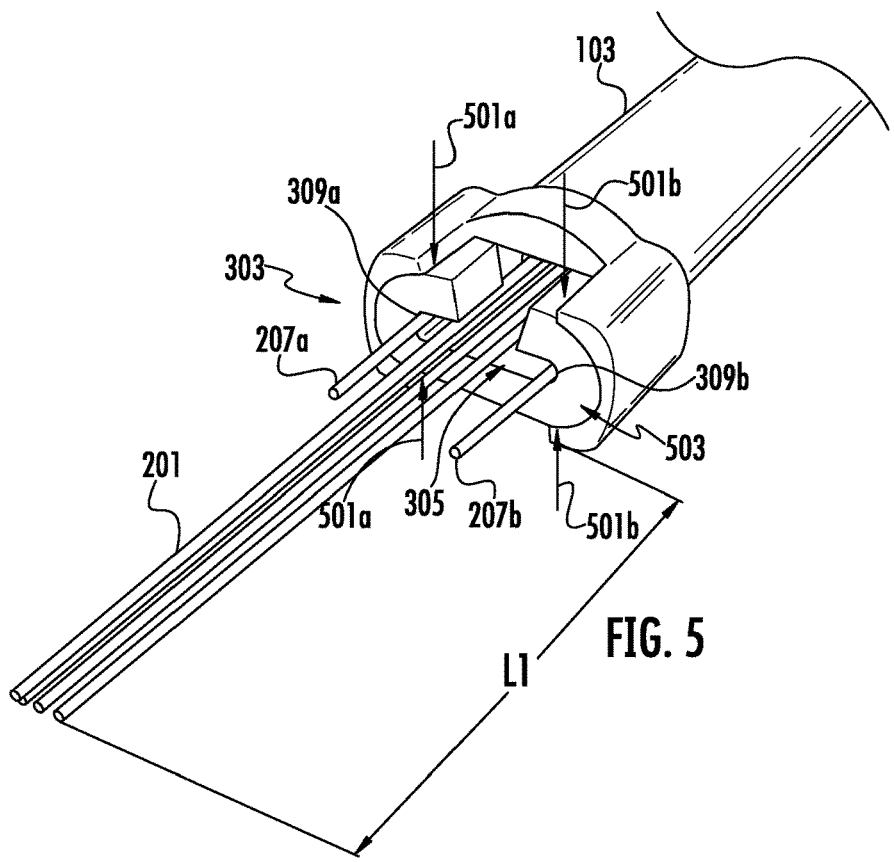
FIG. 5 illustrates an example step of attaching the inner portion of the assembled collar to end portions of strength members of the fiber optic cable to form a fiber optic cable sub-assembly.
Figure 6:
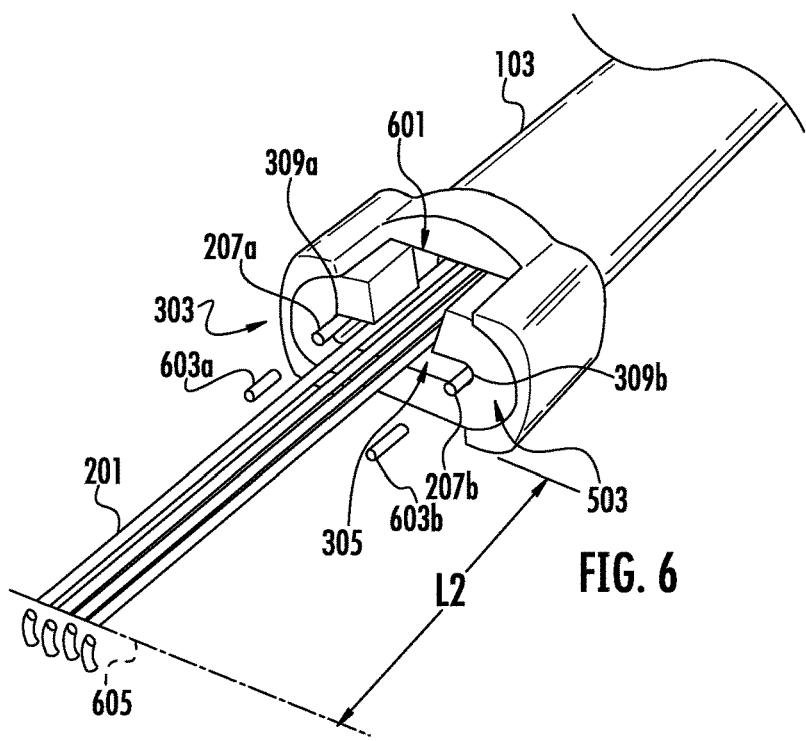
FIG. 6 illustrates a step of trimming optical fibers from the fiber optic cable to extend a predetermined distance beyond the inner portion of the collar.

As shown in FIGS. 5 and 6, once the inner portion 303 is attached to the end portions of the metal strength members 207a, 207b, the optical fiber 201 as well as the metal strength members 207a, 207b can each extend through the axial slot 305 of the inner portion 303. Orienting the metal strength members 207a, 207b to extend through the inner portion 303 can maximize the area of the metal strength members that are gripped during crimping action. Moreover, once secured, the optical fibers 201 also pass through a central portion of the axial slot 305 located between the opposite radial end portions 309a, 309b to protrude from an outer axial end 503 of the collar 301. As further illustrated in FIG. 6, the axial slot 305 can also include an optional radial opening 601 providing radial access into the axial slot 305. The radial opening 601, if provided can facilitate the crimping action of the end portions of the inner portion 303 of the collar 301 while also providing a window for allowing the optical fibers to bend upwardly into the connector housing 107. In other words, the radial opening 601 allows the optical fibers 201 freedom for placement and routing toward the connector.

Of course, the inner portion 303 of the collar 301 can comprise any suitable material nonconductive material such as resin, plastic, composite or other nonconductive material; however, these materials may be more difficult to deform to attach strength members. Alternatively, the inner portion 303 may comprise a conductive material that is easier to deform such as a suitable metal. For example, the inner portion 303 may comprise metal (e.g., stainless steel, brass, etc.), conductive resin, or other conductive material. Providing the inner portion 303 from conductive material, such as metal, can increase the strength of the overall attachment to the fiber optic cable 103. For example, crimping inner portion 303 made from metal can be particularly beneficial to attach, such as fixedly and rigidly attach, with the end portions of the metal strength members. The crimping of the suitable metal inner portion to metal strength members can provide a solid and particularly strong structure for providing a sub-assembly with a robust and easy to manufacture cable strain relief.

As further illustrated in FIGS. 3 and 4, the collar 301 further includes an outer portion 311 including a cavity 313 configured to receive the inner portion 303 as shown in FIG. 4. In this embodiment, cavity 313 is generally aligned along the longitudinal axis (i.e., aligned with the long axis of the connector) and has a socket-like shape, but the cavity can have other alignment arrangements such as in a direction that is transverse with the longitudinal axis. In some examples, the outer portion 311 may be formed from a dielectric material for electrical isolation, although conductive materials may be used in further examples as desired. Electrical isolation is more important with cable assemblies having long-lengths to inhibit electrical interference; however, electrical isolation may not be an issue with cable assemblies having short lengths such as about 3 meters. Referring to FIG. 3, the outer portion 311 can include a side wall 315 and a back wall 317 that may include a passageway 319 for optical fibers 201 and the metal strength members 207a, 207b. In some examples the outer portion 311 may comprise conductive materials such as metal. In further examples the outer portion 311 may be formed from a dielectric material such as nonconductive resins, plastics or other nonconductive material configured to electrically insulate a conductive inner portion of the collar from other portions of the optical cable assembly 101.

The connector housing 107 can be attached to the collar 301 in a wide variety of configurations. Once connected, the connector housing 107 together with the collar 301 and the metal strength members 207a, 207b can provide a robust structure configured to strain relief the cable, protect the optical fibers 201 and electrically isolate other electrical components within the connector housing 107.

Figure 7:
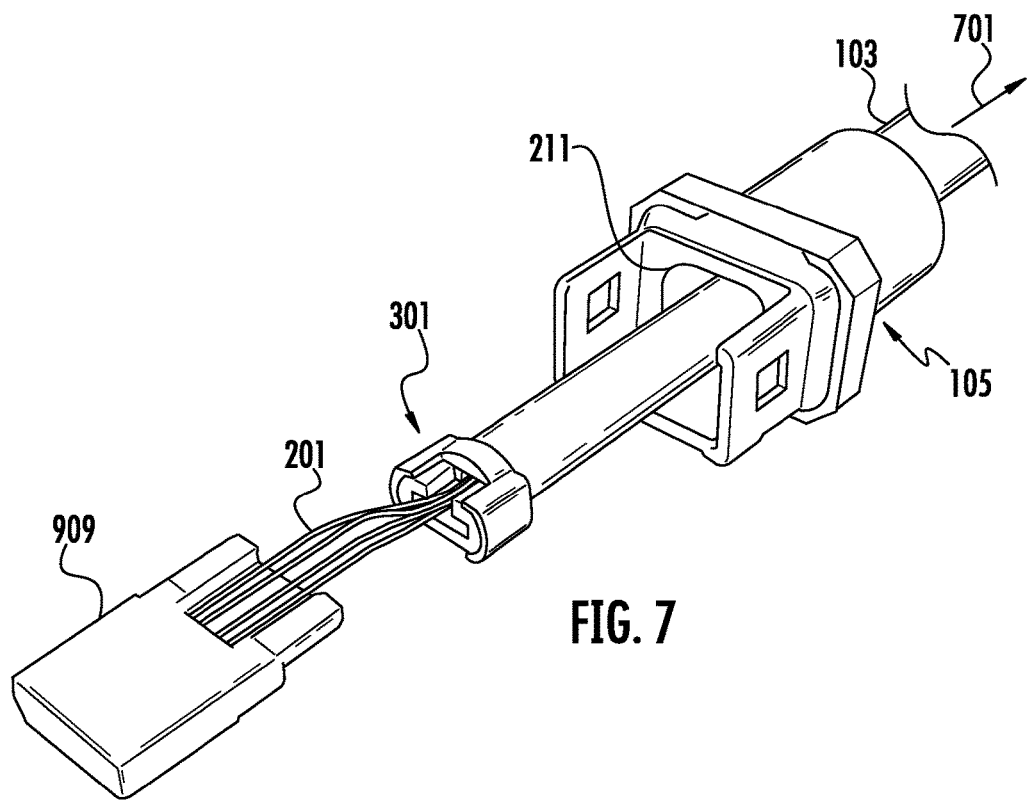
FIG. 7 illustrates a step of operably connecting the optical fibers to an interface such as a total internal reflection block.
Figure 8:
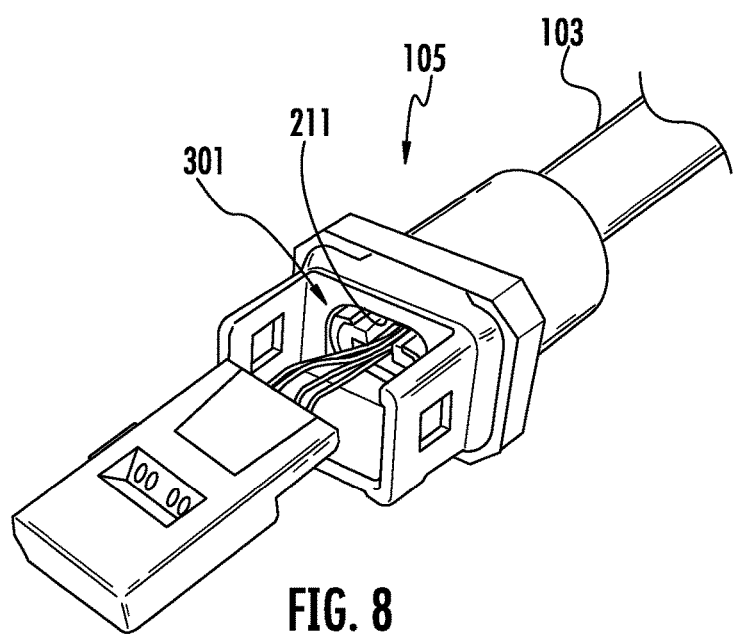
FIG. 8 illustrates a step of seating the collar within the cable boot.

Although not required, in one example, the cable boot 105 can be configured to attach the connector housing 107 to the collar 301. In one example, the outer portion 311 comprises a dielectric material wherein the outer portion 311 of the collar 301 electrically insulates the inner portion 303 of the collar 301 from the connector housing 107. For instance, as shown in FIG. 7, the fiber optic cable 103 can be retracted relative to the cable boot 105 along direction 701 until the collar 301 is seated within the receptacle 211 as shown in FIG. 8. In one example, the receptacle comprises a socket shaped to closely receive and cradle the collar 301 to inhibit relative movement between the collar 301 and the cable boot 105 once the cable boot is attached to the connector housing 107. Moreover, the collar 301 can be keyed into the receptacle 211 to be nonrotatably seated within the receptacle. For instance, the receptacle 211 can comprise an oblong socket configured to receive the oblong outer periphery of the collar 301. As shown in FIG. 8, once seated, the outer portion 311 of the collar 301 can electrically insulate the inner portion 303 of the collar 301 from the cable boot 105, when the outer portion 311 is a dielectric material and the inner portion 303 is a conductive material attached to conductive strength members. Further, providing an electrical insulation layer between the inner portion 303 and the cable boot 105 can further inhibit electrical current from traveling through the metal strength members 207a, 207b of the fiber optic cable 103 and into the connector such as to the connector housing 107.

Figure 9:
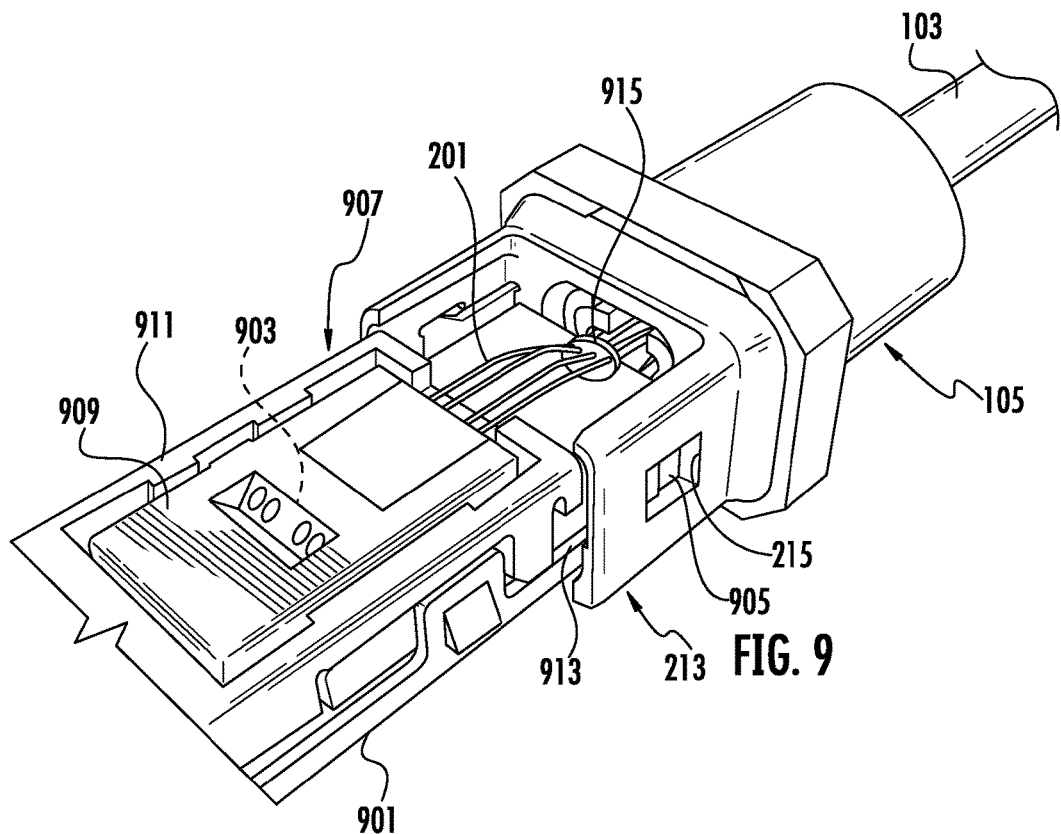
FIG. 9 illustrates a step of attaching the cable boot to a first housing member and interfacing the optical fibers with one or more active components to be housed within a connector housing.

Once the collar 301 is seated within the receptacle 211, as shown in FIG. 9, the cable boot 105 can be attached to the connector housing 107 by way of the snap bracket 213. Indeed, the connector housing 107 can include a first housing member 901 comprising a cradle for an active component 903 (See FIG. 12). The active component 903 can comprise integrated chips, photodiodes, VCSEL and/or other components such as disposed on a circuit board of the like at or near the connector for converting optical signals to electrical signals or vice versa. The first housing member 901 can include a snapping connection 905 configured to snappingly engage the windows 215 of the snap bracket 213.

The optical cable assembly may also include an interface 907 operably connecting the optical fiber 201 to the active component 903 to be housed within the connector housing 107. As shown, the interface 907 can include a total internal reflection block (TIR) 909 that may be operably attached to the optical fiber 201 (as shown in FIG. 7). As shown in FIG. 9, the TIR can then be aligned and attached to a circuit board with respect to the active component(s) 903. The active component 903 is shown aligned with the TIR block 909 in FIG. 12 and is shown hidden behind the TIR block 909 in FIG. 9. As such, the optical fibers 201 are placed in optical communication with the active component 903 to be housed within the housing of the connector. In one example, the active component 903 may be incorporated on a circuit board 913 such as a printed circuit board (PCB) with other components configured to process the optical signals from the optical fibers into electrical signals for providing and from the plug 109 shown in FIG. 1.

As further shown in FIG. 9, an attachment element 915, such as a quantity of glue or other agent may be provided to help arrest relative motion of the optical fibers 201 relative to themselves and relative to the cable jacket 203 inside the connector. In other words, the attachment element 915 inhibits the optical fibers from pistioning into/out of the cable and applying forces that may disrupt the attachment of the optical fiber within the connector. As such, once the TIR block 909 is installed, the desired optical fiber 201 orientation may be correctly positioned to help further arrest undesired movement of the optical fibers 201 within the housing and relative to the collar.

Figure 10:
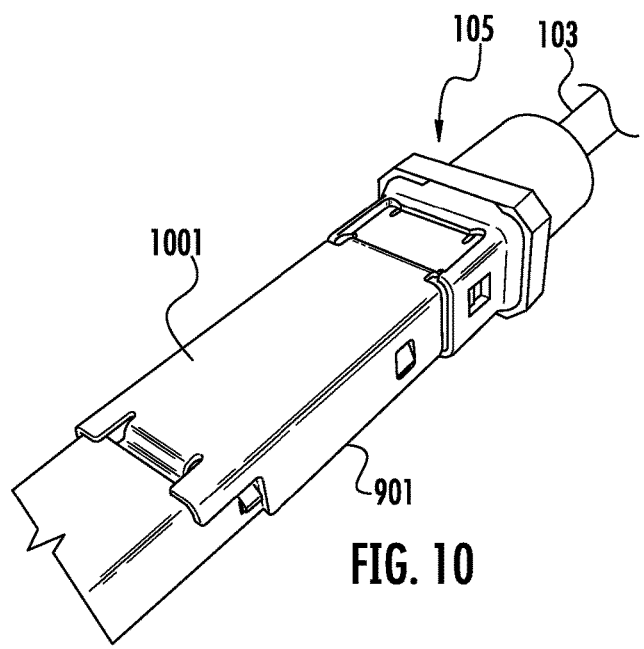
FIG. 10 illustrates the step of attaching a second housing member to the first housing member to house the one or more active component within the connector housing.
Figure 11:
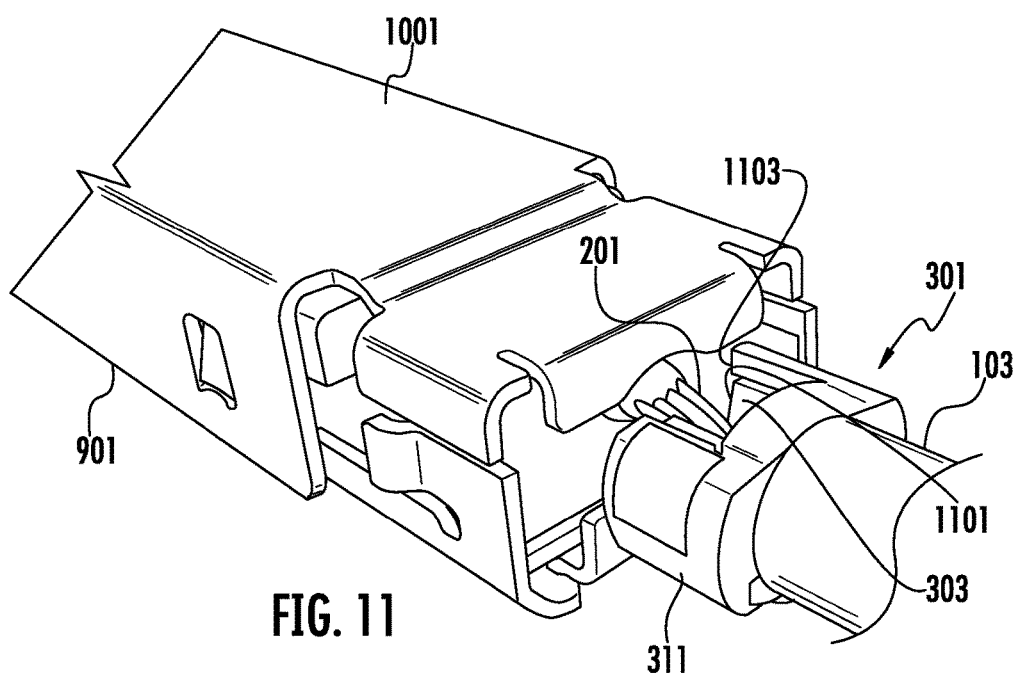
FIG. 11 is a rear perspective view of FIG. 10 with the cable boot removed for illustration purposes.

FIG. 10 illustrates a second housing member 1001 that can be mounted to the first housing member 901 to effectively house and protect the interface connection and electrical components housed within the connector housing 107. In one example, the first and second housing member 901, 1001 may comprise metallic housing members that, in some examples, may be further insulated from the inner portion 303 by way of the outer portion 311. FIG. 11 is a rear perspective view of FIG. 10 with the cable boot 105 being removed for clarity. As shown, the outer portion 311 can inhibit electrical contact of the inner portion 303 with the first and second housing members 901, 1001. As such, any electrical current passing along the metal strength members 207a, 207b will be inhibited from passing through the inner portion 303 of the collar 301 and the connector housing 107. Moreover, as shown in FIG. 11, and with further reference to FIGS. 13 and 14, the outer axial end 1101 of the inner portion 303 may be recessed within the cavity of the outer portion 311. As such, the outer axial end 1103 may help space the inner portion 303 away from the housing members 901, 1001, further helping electrically insulate the inner portion 303 from the housing members 901, 1001. Once assembled as shown in FIG. 1, an outer housing 111 can be added over a portion of first and second housing members 901,1001 to further finish the optical cable assembly 101 and further protect the components within the housing from damage. For instance, the outer housing 111 can slide onto the housing from the front of the connector or be over-molded over the housing.

The disclosure is also directed to methods of making the sub-assembly including providing a fiber optic cable with at least one optical fiber, a cable jacket that houses the optical fiber and at least one strength member, pproviding a collar including an inner portion seated within a part of an outer portion, and attaching the inner portion to a first end portion of the strength member, wherein a first end portion of the optical fiber extends through the collar to protrude from an outer axial end of the collar. The method of making the sub-assembly may include other steps such as attaching (i.e. operably connecting) the optical fibers to an interface. In one example, the optical fibers are attached to a TIR block.

Further example methods of assembling the optical cable assembly will now be described with specific reference to the drawings. As shown in FIG. 2, the method can include the step of providing the fiber optic cable 103 with the least one optical fiber 201, the cable jacket 203 that houses the optical fiber 201 and the at least one metal strength member 207a, 207b. As shown in FIG. 4, the method includes the step of providing the collar 301 including the inner portion 303 seated within the outer portion 311. In one example, the inner portion 303 is recessed within the outer portion 311 although an outer edge of the dielectric portion may be flush with an outer axial end of the inner portion in further examples.

If provided, the method can include the optional step of threading the end portion 209 of the fiber optic cable 103 through the cable passage within the cable boot 105 and out through the receptacle 211.

As shown in FIG. 5, the method can then include the step of attaching the inner portion 303 to the end portions of the metal strength member 207a, 207b. For example, as shown in FIG. 5, the metal strength members 207a, 207b can be fully inserted through the axial slot 305 and seated within the opposite radial end portions 309a, 309b. Next, the method may include the optional step of crimping the inner portion 303 to the end portions of the metal strength members 207a, 207b within the axial slot 305 or other structure. At the same time, the optical fibers 201 can extend beyond the inner portion, for example, by a distance L1 from the outer axial end 503 of the collar 301.

Optionally, as shown in FIG. 6, excess portions 603a, 603b of the metal strength members 207a, 207b may be trimmed, particularly if the excess portions 603a, 603b would interfere with attachment of the collar to the connection housing or interfere with the insulation of the collar and metal strength members from the housing.

As further illustrated in FIG. 6, the method can also include the step of trimming the optical fiber 201, for example, along trim line 605 such that the optical fibers 201 extend a predetermined distance L2 beyond the axial outer end 503 of the inner portion. As such, during assembly, the inner portion 303 can provide a measuring point to consistently provide a desired predetermined length of optical fiber to carry out interfacing with the component within the connector housing.

As shown in FIG. 7, once the desired predetermined length of optical fiber 201 is obtained, the method may further include the optional step of operably connecting the optical fibers 201 to an interface such as a total internal reflection block 909. As the predetermined length of optical fiber is ensured, the proper alignment of the internal reflection block can be achieved without complications that may otherwise occur with too optical fibers that are too long or too short.

The method further includes the step of attaching the collar 301 to the connector housing 107, wherein the outer portion 311 of the collar 301 may optionally electrically insulate the inner portion 303 of the collar 301 from the connector housing 107. For example, as shown in FIG. 8, the method can further include the step of retracting the collar 301 within the receptacle 211 such that the collar 301 is seated within the cable boot 105. Once seated, the dielectric portion 311 of the collar 301 electrically insulates the inner portion 303 of the collar 301 from the cable boot 105. Gluing, pressure fitting or other techniques may be used to help prevent unseating of the inner portion 303 of the collar from the outer portion 311 of the collar and/or help prevent unseating of the collar 301 from the receptacle 211. Next, the snap bracket 213 of the cable boot 105 is attached to the first housing member 901 by the snapping connection above wherein the outer portion 311 of the collar 301 can optionally further insulate the inner portion 303 from the connector housing 107.

Next, as shown in FIG. 9, the optical fiber 201 can be interfaced with an component to be housed within the housing. For example, the TIR 909 can be aligned with the active component 903 (see FIG. 12) and attached by way of attachment bracket 911 (see FIG. 9).

As shown in FIG. 10, the second housing member 1001 can be attached to the first housing member 901 and the internal housing components may be mounted within the outer housing portion 111.

Figure 12:
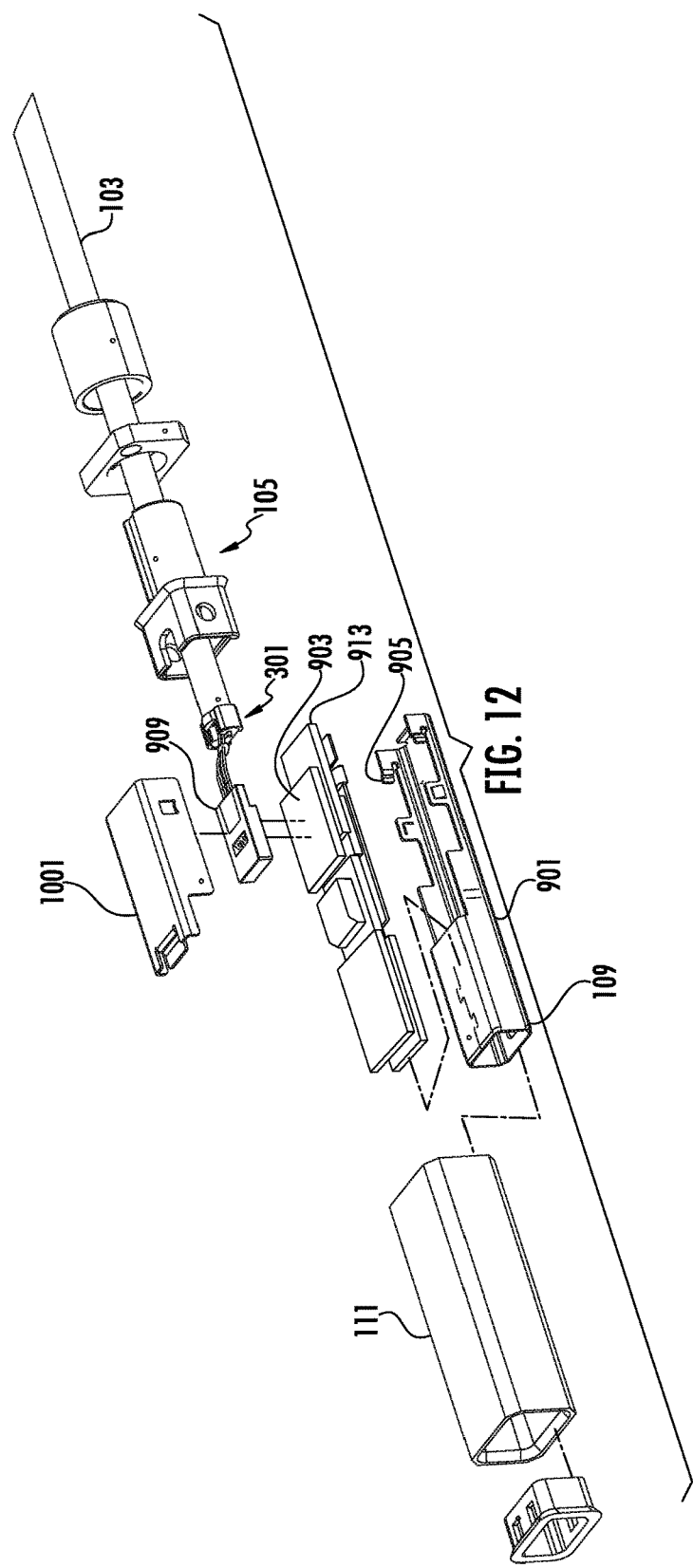
FIG. 12 is an exploded perspective view of portions of an example fiber optic cable assembly.

FIG. 12 illustrates an exploded view of portions of one end of a fiber optic cable assembly including a first cable sub-assembly discussed above. A similar, such as an identical second cable sub-assembly may be provided at the opposite end of the cable 103 (not shown) if desired. Moreover, a similar such as an identical interface and housing may likewise be provided at the opposite end of the cable sub-assembly for forming connectors on both ends of the cable if desired. As such, the cable assembly may have a configuration shown in FIG. 12 at both ends of the cable wherein circuitry can comprise active components configured to convert electrical signals to optical signals and/or optical signals to electrical signals depending on the particular application.

FIG. 12 illustrates how the TIR block 909 can be aligned with the active component 903 prior to mounting and how the TIR block 909, active component 903 and circuit board 913 can be mounted within the first and second housing members 901, 1001. FIG. 12 still further illustrates how the assembled first and second housing members 901, 1001 (with the TIR block 909, active component 903 and circuit board 913) can be mounted within the outer housing portion 111.

FIG. 13 is a cross-sectional view of assembled portions of the fiber optic cable assembly of FIG. 12 along line 13-13 of FIG. 14. Likewise, FIG. 14 is a cross-sectional view of assembled portions of the fiber optic cable assembly of FIG. 12 along line 14-14 of FIG. 13. FIG. 13 demonstrates the nested relationship of the TIR block 909 operably connected with the active component 903 within the first and second housing members 901, 1001 and within the outer housing portion 111. FIG. 14 illustrates the snapping connection 905 of the first housing member 901 snappingly engaging the windows 215 of the snap bracket 213 of the cable boot 105.

The collar 301 of the present disclosure includes an inner portion that may create a particularly robust connection with the metal strength members of a fiber optic cable; but, other embodiments may use the concepts with dielectric strength members. As an example of the robust cable attachment, the crimp solution of the inner portion 303 to the metal strength members 207a, 207b can provide pull strength of greater than 100 Newtons, and even a pull strength of greater than 200 Newtons depending on the material and size of the strength members. The collar 301 can be designed to provide electrical isolation of the internal components of the housing from the metal strength members while also transmitting forces from the cable directly to the housing, thereby isolating the optical fibers and connections within the housing from pull forces. At the same time, the collar can provide a mechanical reference for further construction of a larger assembly from the sub-assembly. For instance, accurate predetermined excess fiber lengths extending beyond the collar can be easily and repeatedly achieved to allow sufficient optical fiber length to ensure proper alignment and interfacing with the components within the connection housing. By using the collar for both the assembly process and the mechanical cable attach in the final product, it is possible to reduce the associated tolerance stack and essentially the length variation between the cable and the TIR, which terminates the optical fibers.

Figure 15:
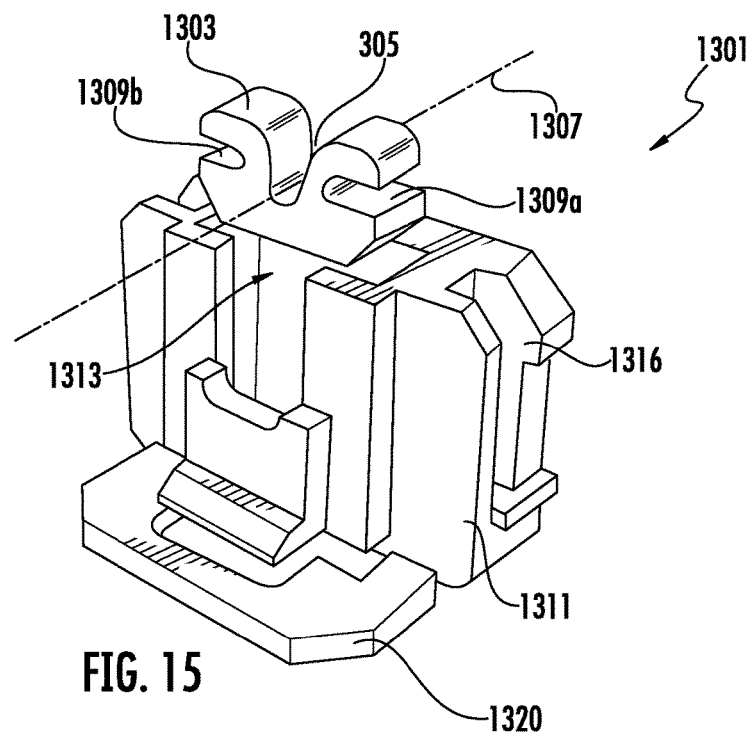
FIGS. 15-17 are various perspective views of another collar including an inner portion and an outer portion.
Figure 16:
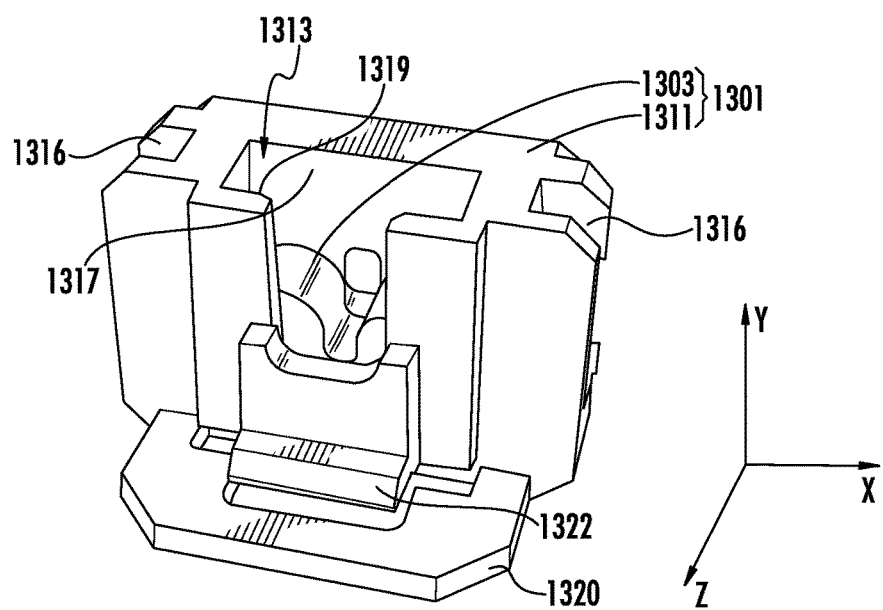
Figure 17:
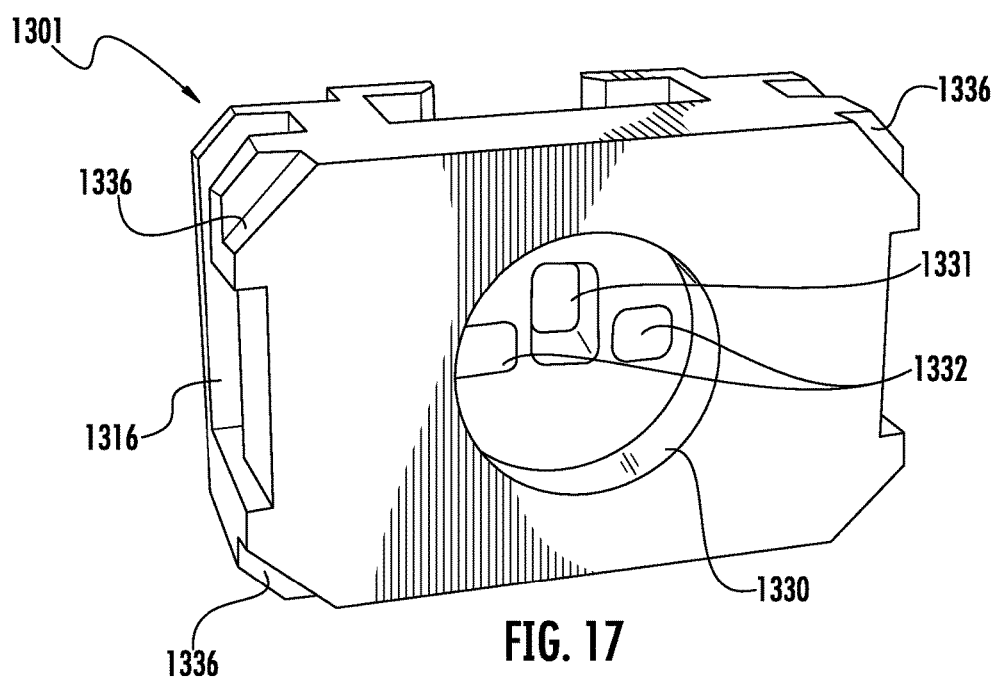

Other arrangements for the collar are also possible using the concepts disclosed herein. By way of example, FIGS. 15-17 are various perspective views of another collar 1301 including an inner portion 1303 and an outer portion 1311 having another suitable construction. Of course, the concepts disclosed may be used with other variations and/or arrangements as desired. Collar 1301 is useful as a component of a sub-assembly and/or a portion of an optical fiber cable assembly as described herein. Like collar 301, the inner portion 1303 of collar 1301 is configured to be attached, such as rigidly attached, to portions of the strength member of the cable such as a stranded metal strength members of the cable or the like. In one embodiment, the inner portion 1303 may optionally be formed from a conductive material for allowing crimping, welding or other attachment method to metal strength members, while outer portion 1311 is formed of a dielectric material. Consequently, the electrically conductive strength members of the cable may be electrically isolated from the connector since the strength members and inner portion 1303 are isolated by the dielectric outer portion 1311 as discussed herein. Stated another way, the outer portion of the collar electrically insulates the inner portion of the collar from the connector housing. However, collar 1301 may be used with fiber optic cables having non-conductive strength members and/or inner portion 1303 that use an adhesive or the like for attachment of the strength members. As shown in FIG. 15, inner portion 1303 of the collar 1301 defines an axial slot 305 extending along an insertion axis 1307 of the inner portion 1303. Inner portion 1303 includes portions 1309a, 1309b for receiving strength members 207a, 207b of the cable. Portions 1309a,1309b are located on opposite radial end portions of inner portion 1303. In this embodiment, the inner portion 1303 is first received in the outer portion 1311 of collar 1301 along an axis that is orientated in a direction that is transverse to a direction of the long axis of the connector (i.e., generally perpendicular to the insertion direction of the optical fibers into the collar). Specifically, inner portion 1303 is received in a cavity 1313 of outer portion 1311 that is orientated in a vertical direction and defined by a back wall 1317 and a front wall 1319 (FIG. 16), instead of being received along an axis parallel with the long axis of connector like collar 1301 (i.e., generally parallel to the insertion direction of the optical fibers into the collar).

FIGS. 16 and 17 are respective perspective views of collar 1301 from a connector side (e.g. the front side) and a cable side (e.g., the rear side) with the inner portion 1303 disposed within a cavity 1313 of outer portion 1311. As shown, the cavity 1313 is sized so that outer portion 1311 has a snug fit in the X- and Z-directions when inserted into cavity 1313 (i.e., seated) in the Y-direction. Moreover, cavity 1313 can open to only one side or be open on two sides as desired. In this embodiment, cavity 1313 is open at the top and bottom (FIG. 22) so that a crimping tool may be inserted from the top and the bottom openings for applying a crimp force for securing the strength members to the inner portion 1303 when being disposed within the outer portion 1311. Further, applying a crimping force from both sides of the inner portion 1303 inhibits excessive forces from being transferred to the outer portion 1311 when attaching the strength members.

Outer portion 1311 has an aperture 1331 that extends to cavity 1313 as best shown in FIG. 16. Aperture 1331 generally aligns with slot 305 so that optical fibers 201 of a fiber optic cable 103 may pass through collar 1301 and extend into the connector as discussed herein. As best shown in FIG. 17, outer collar 1331 also includes one or more openings 1332 that extend into cavity 1313 for receiving strength members 207a,207b of the fiber optic cable 103. In this embodiment, openings 1332 are disposed outboard of aperture 1331 and have a size and spacing for allowing strength members 207a, 207b to pass into cavity 1313 and be secured to the inner portion 1303 of the collar 1301. Specifically, openings 1332 are aligned with portions 1309a, 1309b of inner portion 1303 so that the strength members 207a,207b enter portions 1309a,1309b of inner portion 1303 after passing through openings 1332 of the outer portion 1311 of collar 1301. Thereafter, the strength members 207a, 207b may be secured to the inner portions 1309a,1309b using a suitable method such as crimping, adhesive, welding, and/or the like.

Figure 22:
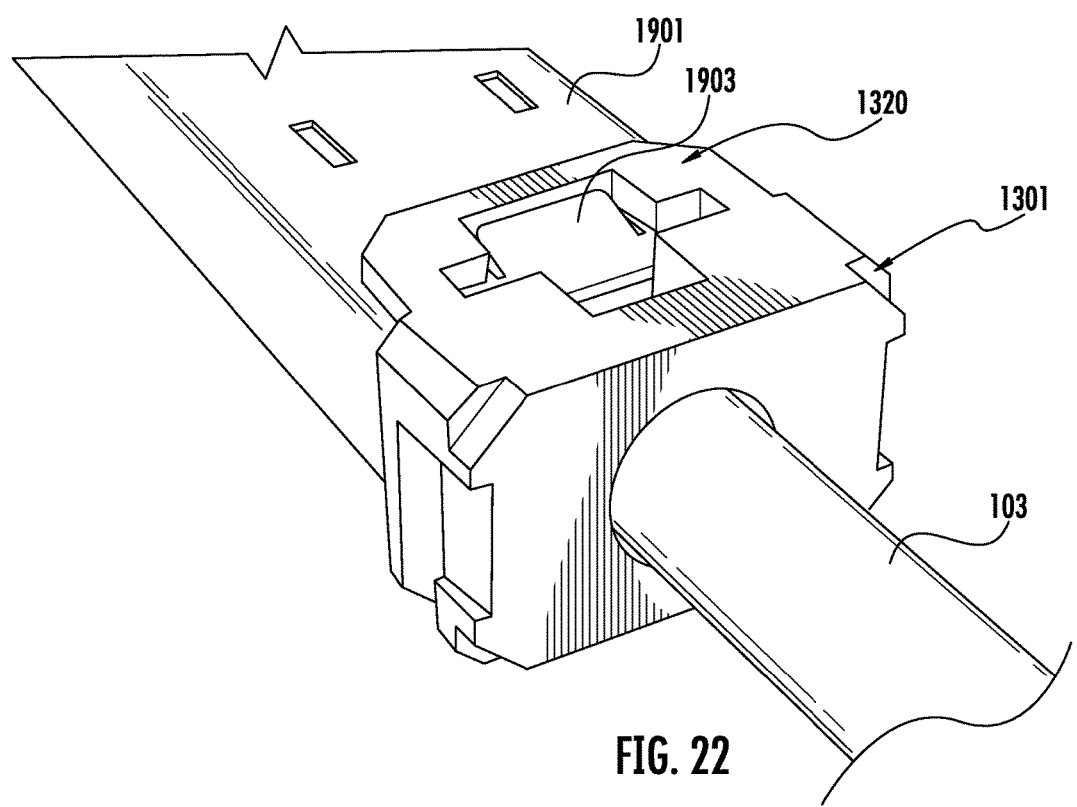
FIG. 22 is a partial rear perspective view of the sub-assembly of FIG. 21 from the bottom showing the collar secured to the portion of the connector.

Outer portion 1311 further includes one or more notches 1316, a first tab 1320 and a second tab 1322. First and second tab 1320,1322 extend toward the connector side of the collar for securing collar 1301 to a housing member of the connector as best shown in FIG. 22. In this embodiment, outer portion 1311 also includes a recessed area 1330 for seating the fiber optic cable 103 to the outer portion 1311. If used, the recessed area 1330 has a size and shape that is slightly larger than the outer dimensions of the cable so the cable may be seated into the recessed area 1330. As shown, the aperture 1331 and openings 1332 are disposed within the recessed area 1330. The outer portion 1311 may also include chamfers 1336 as desired.

Figure 18:
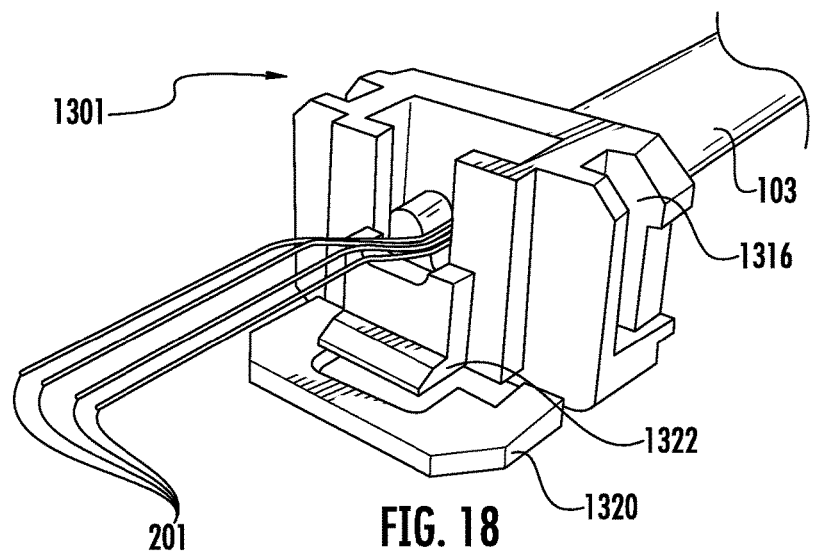
FIG. 18 is an assembled perspective view of the collar of FIG. 15 as a portion of a fiber optic cable sub-assembly with the inner portion being seated within the outer portion.

FIG. 18 is an assembled perspective view of collar 1301 as a portion of a fiber optic cable sub-assembly. Consequently, the optical cable assembly may be assembled as separate sub-assemblies that are later joined for improving manufacturing efficiency like other embodiments. As shown, fiber optic cable 103 is attached to the collar 1301 with the optical fibers 201 extending through collar 1301 to protrude form an outer axial end of the same by a given length. In other words, the optical fibers 201 extend beyond the collar 1301 so they may be attached to a suitable component inside the connector of the optical cable assembly such as an interface or the like.

Figure 19:
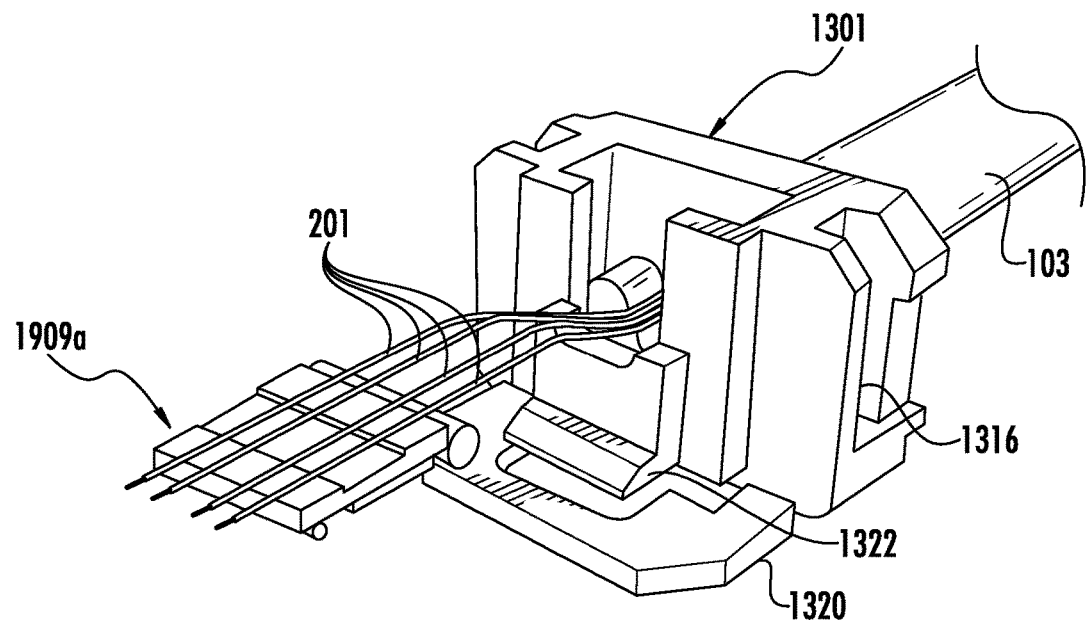
FIG. 19 is a perspective view of the sub-assembly of FIG. 18 showing the optical fibers of the cable being attached to a portion of an interface that includes a fiber tray.
Figure 20:
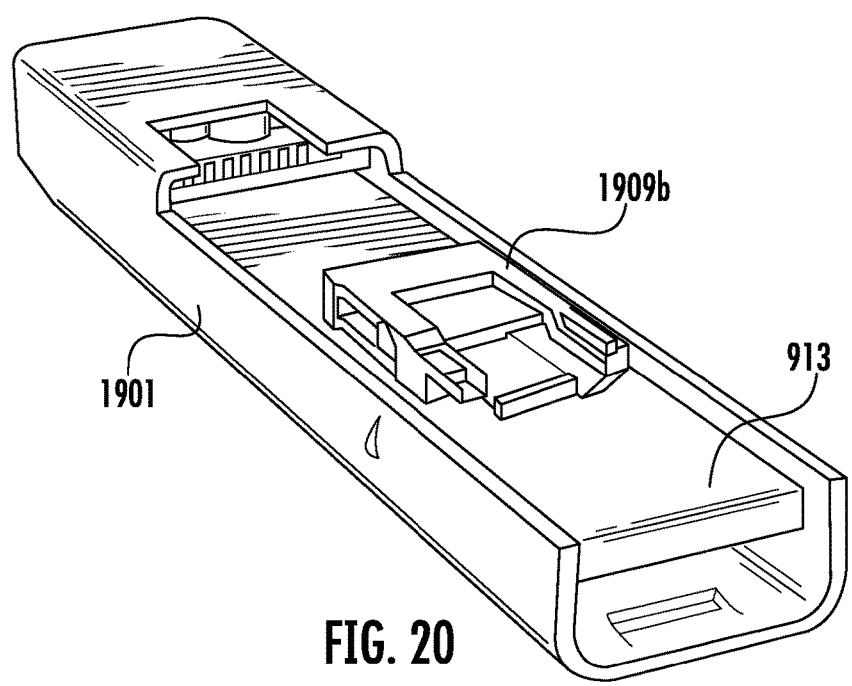
FIG. 20 is a rear perspective view of a portion of a connector for attachment with the assembly of FIG. 19.
Figure 21:
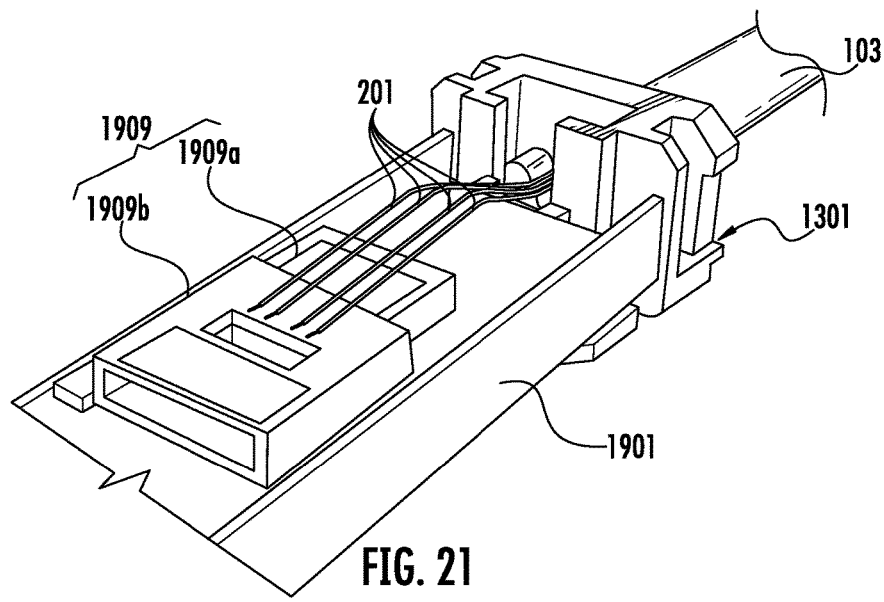
FIG. 21 is a partial front perspective view of the sub-assembly of FIG. 19 secured to the portion of the connector of FIG. 20.

FIGS. 19 and 20 depict respective sub-assemblies that may be joined together for forming a portion of the optical cable assembly. In this particular embodiment, an interface 1909 is configured as a 2-piece TIR block used for turning the optical signals to and from the optical fibers to the active components disposed on a circuit board 913. Specifically, FIG. 19 is a perspective view of the sub-assembly of FIG. 18 showing the optical fibers 201 of fiber optic cable 103 attached to a first portion of interface 1909 that is configured as a fiber tray 1909a. And FIG. 20 is a rear perspective view of a portion of a connector of the optical cable assembly for attachment with the sub-assembly of FIG. 19. Specifically, connector sub-assembly of FIG. 20 has a second portion of interface 1909 configured as an optical module 1909b that is disposed on circuit board 913 and turns the signals to/from the optical fibers 201 from/to the active components (not visible) on the circuit board 913. FIG. 21 is a partial front perspective top view of the sub-assembly of FIG. 19 secured to the sub-assembly FIG. 20 so that the optical fibers 201 held in fiber tray 1909a are in optical communication with the respective optical channels of optical module 1909b as shown.

Having interface 1909 composed of two or more parts allows manufacturing of the collar sub-assembly (FIG. 19) separate from the manufacture of the connector sub-assembly (FIG. 20) and later joining the sub-assemblies for improving manufacturing efficiency. By way of explanation, the fiber optic cable 103 can be attached to collar 1301 as discussed and then the optical fibers 201 may be attached to fiber tray 1909a. Fiber tray 1909a may act as a fixture for aligning and fixing the optical fibers 201 and allowing processing the respective ends of the optical fibers 201 using a suitable method. For instance, the optical fibers may be attached to grooves in the fiber tray 1909a using an adhesive or the like so that a length of the optical fibers extend beyond the fiber tray 1909a. Consequently, the optical fibers 201 are fixed in position relative to each other in the fiber tray 1909a so that coatings on the ends of the optical fibers may be stripped and the end of the fibers cleaved to the proper length with the desired end-face geometry. For instance, a laser may be used to precisely strip the coating from the fiber and for cleaving the optical fibers to length using the fiber tray 1909a as a datum. Alternatively, other stripping and/or cleaving processes are possible with the fiber tray such as mechanical or chemical. Likewise, the connector sub-assembly having optical module 1909b may be manufactured independently from collar sub-assembly. By way of explanation, the circuit board 913 may be manufactured using known techniques with the active components (not visible in FIG. 20) that receive or transmit optical signal disposed thereon along with the other electrical components of the circuit board. Thereafter, the optical channels of optical module 1909b are aligned with the active components on the circuit board 913 with a suitable alignment for receiving/transmitting the optical signals to/from the optical fibers. Optical module 1909b may use an active and/or passive alignment techniques for aligning and attaching it to the circuit board 913.

FIG. 22 is a partial rear perspective view of the sub-assembly of FIG. 21 from the bottom showing the collar 1301 secured to the portion of the first housing member 1901 of the connector sub-assembly. First tab 1320 and second tab 1322 of the outer portion 1331 of collar 1301 are used for securing the collar 1301 to first housing member 1901. As shown in FIG. 15, there is a small gap between first tab 1320 and second tab 1322 so that an end portion of the first housing member 1901 may be aligned and inserted between the tabs. Further, first housing member 1901 has a protrusion 1903 that is shaped and sized for cooperating with an opening defined by first tab 1320 as depicted. Consequently, collar 1301 can snap-fit to the first housing member 1901 by slightly deflecting protrusion 1903 as the first housing member is inserted between the tabs, and then when fully inserted protrusion 1903 resiliently springs upward with the opening defined by first tab 1320 for securing the two sub-assemblies together. Of course, the concepts of the collar may have other methods and/or features for securing the collar.

Figure 23:
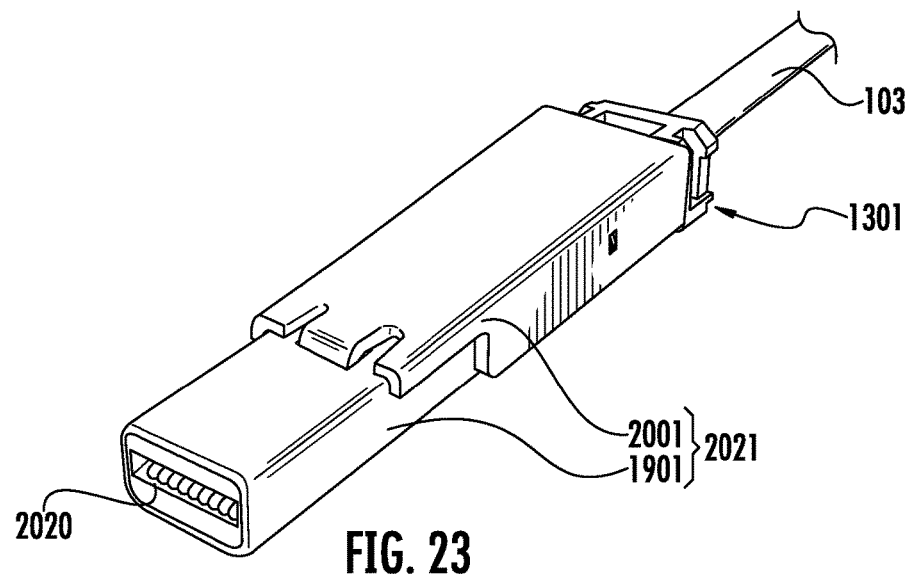
FIG. 23 is a perspective view showing the sub-assembly with an upper portion of the housing attached to a portion of the connector.

FIG. 23 is a perspective view showing second housing member 2001 attached to first housing member 1901 to form housing 2021. Housing 2021 is typically formed from a conductive material such as metal and collar 1301 may be useful for electrically isolating conductive strength members of the fiber optic cable from the housing 2021 as discussed. The front of the housing 2021 may also define an outer portion of the electrical interface 2020 of the connector of the optical cable assembly.

Figure 24:
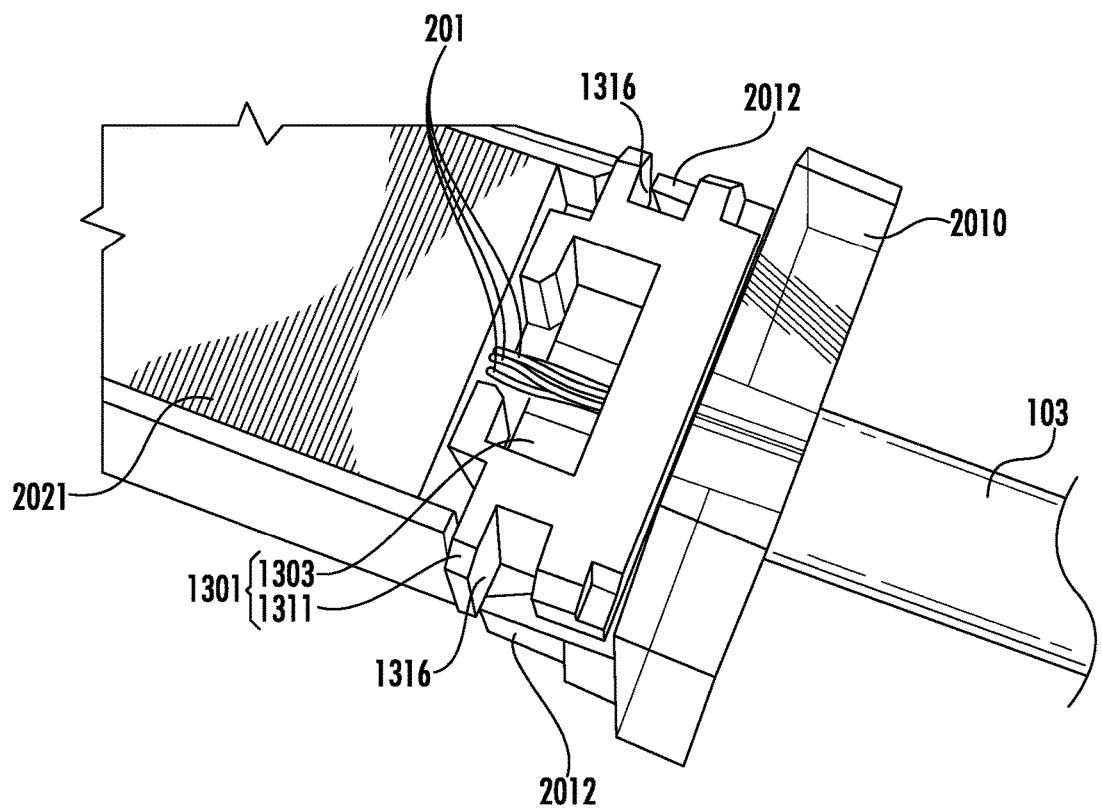
FIG. 24 is a partial top view of the assembly of FIG. 23 showing the collar secured to the connector along with an end cap.

FIG. 24 is a partial top view of the assembly of FIG. 23 showing the collar 1301 secured to the housing of the connector. As shown, this embodiment also includes an optional end cap 2010 having a passageway 2013 and attachment features 2012. As shown in this embodiment, attachment features 2012 of end cap 2010 are cantilevered arms having locking protrusions that engage notches 1316 for securing end cap 2010 to outer portion 1311 of collar 1301. During assembly, end cap 2010 is threaded onto fiber optic cable 103 using the passageway before the strength members of fiber optic cable 103 are secured to the collar 1301. Then, the end cap 2010 can be slid along the cable toward the connector for engaging the collar 1301 as depicted.

The passageway 2013 of the end cap 2010 may optionally have a shape that provides side bend relief for the fiber optic cable or other design can use a boot for providing conventional bend strain relief. For example, a rear opening 2016 has a dimension D2 that is larger than a dimension D1 of the front opening 2014 for providing cable bend relief. In other words, cable bend relief structure is integrally formed within the passageway of the end cap 2010 for allowing a gentle bend radius for the cable near the end cap 2010. Stated another way, the fiber optic cable 103 may be bent sideways relative to the longitudinal axis of the connector at up to 90 degrees or more while allowing the fiber optic cable to maintain a suitable bend radius without an external bend relief structure extending rearward on the cable. Moreover, using an end cap as described provides a compact and clean-looking connector footprint since no dedicated discrete components such as a boot or overmolded portion are required for cable bend relief.

Figure 25:
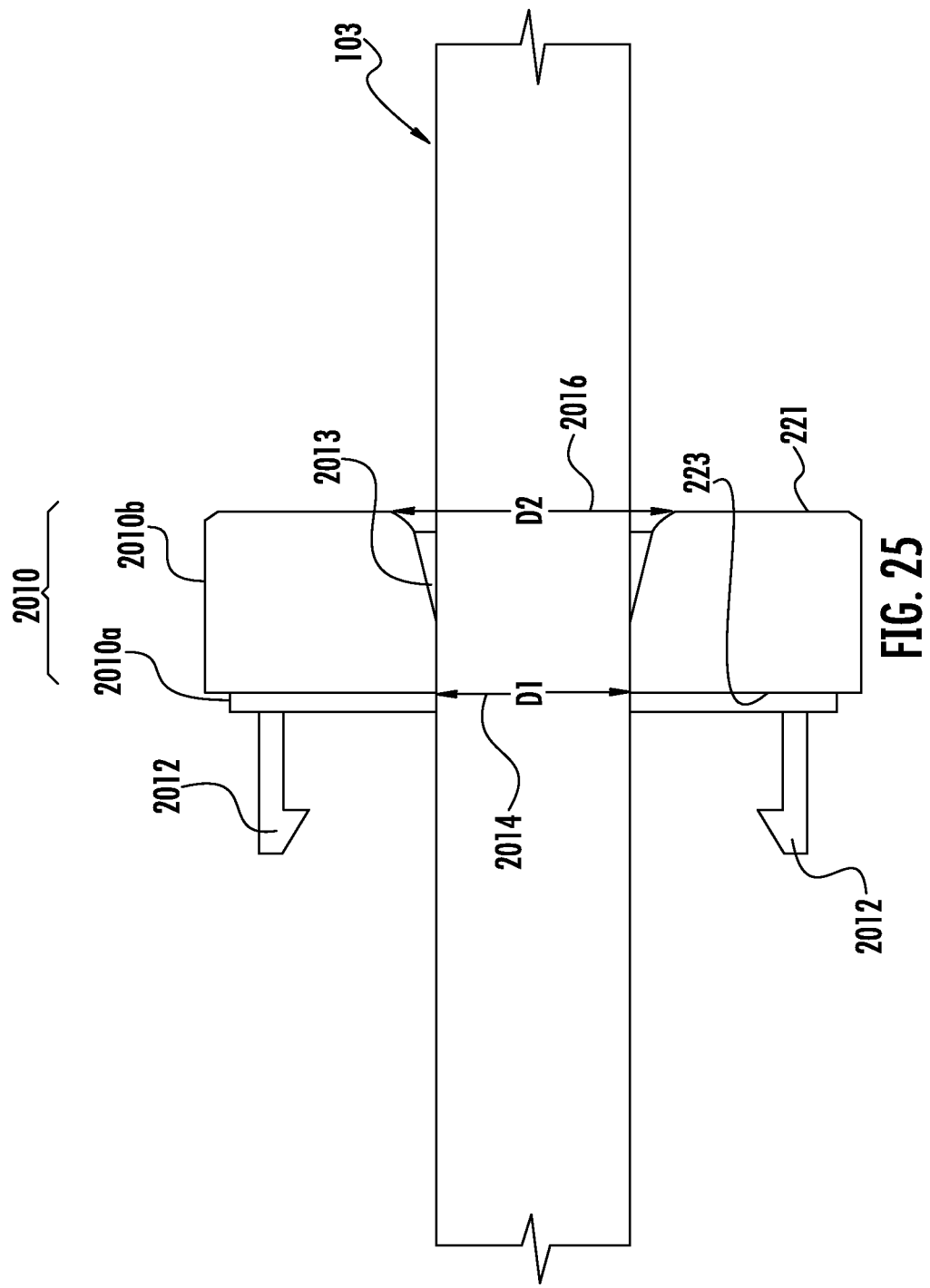
FIG. 25 is a schematic cross-sectional view showing a passageway of the end cap with a fiber optic cable passing therethrough.

Further, passageway 2013 can have any suitable size and/or shape to compliment the cross-section of the cable extending therethough. For instance, the shape of the passageway may be influenced by the shape of the cable such as round, oval, or flat; likewise, the construction/bend radius of the cable can also influence the shape of the passageway. As shown in FIG. 25, passageway 2013 extending through end cap 2010 has a funnel-shape for protecting the fiber optic cable 103 during side-bending. As used herein, "funnel-shaped" means that the passageway provides a shape that generally transitions from a smaller opening near the front end (e.g., the connector-side) of the end cap toward a larger opening near the rear end (e.g., the cable-side) of the end cap so that the optical fiber cable can maintain a proper bend radius during aggressive bending as it exits the connector. In other embodiments, the passageway 2013 can be tailored for a non-round cable cross-section such as flat or oval which may have different curvatures, tapers and/or radii between the rear opening and the front opening.

As shown in this embodiment, the end cap 2010 may be transparent or translucent so that the outer portion 1311 of collar 1301 is visible therethrough or have a portion that is transparent or translucent so a color is visible through the end cap 2010. This aesthetic feature may be accomplished by forming the end cap 2010 as one or two or more different parts so that it has two different colors. By way of example, end cap 2010 may be molded in a two-shot operation for creating an end cap 2010 with two different colors by molding a first portion 2010*a* in a first mold shot that is colored and then molding a second portion 2010*b* as transparent or translucent in a second mold shot. As a further example, end cap 2010 may be formed of two different portions such as first portion 2010*a* that is a first color and second portion 2010*b* that is translucent or transparent and then the two portions 2010*a*,2010*b* are ultrasonically welded together. Consequently, the contrasting color of the outer portion 1311 of a portion of the end cap 2010 is visible through the translucent or transparent portion of the end cap 2010, thereby creating a sleek looking aesthetic feature for the assembly. In a similar fashion, cable boot 105 of the other embodiment may be formed to have a translucent or transparent portion as described for creating a similar sleek looking aesthetic feature.

Figure 26:
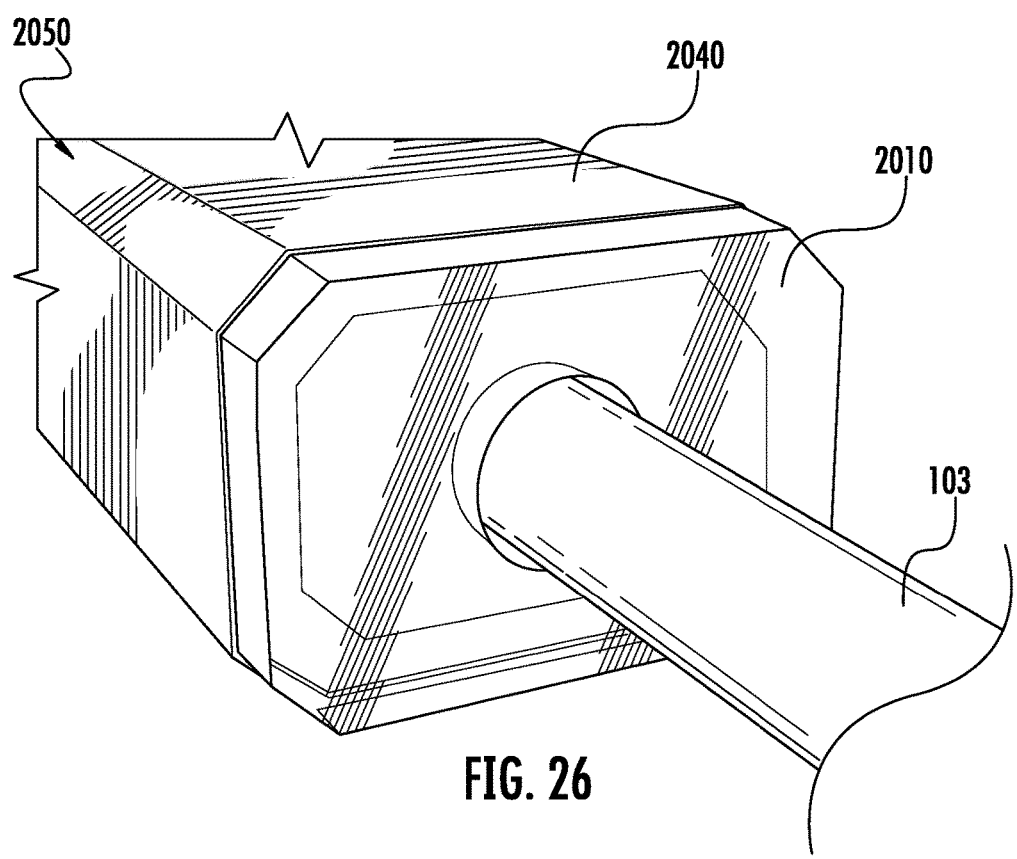
FIG. 26 is a rear perspective view of the connector with a housing secured about the shell.

FIG. 26 is a rear perspective view of the connector forming an active optic cable assembly 2050. Specifically, an outer housing 2040 is secured about the first and second housing members 1901,2001 and attached to collar 1301, thereby forming cable assembly 2050.

It will be apparent to those skilled in the art that various modifications and variations can be made to the present disclosure without departing from the spirit and scope of the disclosure. Thus, it is intended that the present disclosure cover the modifications and variations of this disclosure provided they come within the scope of the appended claims and their equivalents.

What is claimed is:

1. A fiber optic cable sub-assembly comprising:
a fiber optic cable including at least one optical fiber, a cable jacket that houses the optical fiber, a first strength member, and a second strength member;
a collar including an inner portion formed from a conductive material and an outer portion formed from a dielectric material, the inner portion comprising an outer axial end that is recessed within a cavity of the outer portion, wherein:
the inner portion defines an axial slot with opposite radial end portions and a central portion located between the opposite radial end portions,
the collar further includes a radial opening providing radial access to the axial slot of the inner portion,
each strength member is disposed within a respective one of the opposite radial end portions, and
the optical fiber extends through the central portion of the axial slot of the collar to protrude from the outer axial end of the collar;
a connector housing attached to the collar, wherein the outer portion of the collar electrically insulates the inner portion of the collar from the connector housing; and
a cable boot for attaching the connector housing to the collar.

2. The fiber optic cable sub-assembly of claim 1, wherein the inner portion of the collar is attached to the end portion of the strength member by a connection selected from the group consisting of a crimped connection, a glued connection and a welded connection.

3. The fiber optic cable sub-assembly of claim 1, wherein the strength member is at least partially encapsulated within the cable jacket.

4. The fiber optic cable assembly of claim 1, further comprising an interface operably connecting the optical fiber to an active component within the connector housing.

5. The fiber optic cable assembly of claim 4, wherein the interface comprises a total internal reflection block operably attached to the optical fiber.

6. The fiber optic cable assembly of claim 4, wherein the interface operably connects the optical fiber to the active component on a circuit board within the connector housing.

7. The fiber optic cable assembly of claim 1, the cable boot including a receptacle, wherein the collar is seated within the receptacle.

8. The fiber optic cable assembly of claim 7, wherein the collar is inhibited from rotating within the receptacle.

9. The fiber optic cable assembly of claim 7, wherein the outer portion of the collar electrically insulates the inner portion of the collar from the cable boot.

10. A fiber optic cable assembly comprising:
a fiber optic cable including at least one optical fiber, a cable jacket that houses the optical fiber, a first strength member, and a second strength member;
a first fiber optic sub-assembly including a first collar with a first inner portion formed from a conductive material and a first outer portion formed from a dielectric material, the first inner portion seated within a cavity of the first outer portion, wherein:
the first inner portion defines a first axial slot with opposite radial end portions and a central portion located between the opposite radial end portions,
the first collar further includes a radial opening providing radial access to the axial slot of the inner portion,
each strength member is disposed within a respective one of the opposite radial end portions of the first axial slot,
the first inner portion comprises an outer axial end that is recessed within a cavity of the first outer portion of the collar,
a first end portion of the optical fiber extends through:
the central portion of the first axial slot of the first collar to protrude from an outer axial end of the first collar,
a first connector housing that is attached to the first collar and electrically insulated from the inner portion of the first collar, and
a first interface attached to the first end portion of the optical fiber, and
the first interface is a total internal reflection block.

11. The fiber optic cable assembly of claim 10, further comprising a second fiber optic sub-assembly including a second collar with a second inner portion seated within a cavity of a second outer portion of the second collar, wherein:
the second inner portion defines a second axial slot with opposite radial end portions,
each strength member is disposed within a respective one of the opposite radial end portions of the second axial slot,
the second inner portion comprises an axial end that is recessed within a cavity of the second outer portion of the collar, and
a second end portion of the optical fiber extends through the second collar to protrude from an outer axial end of the second collar, a second connector housing attached to the second collar, and a second interface attached to the second end portion of the optical fiber.

12. A method of assembling a fiber optic cable sub-assembly comprising:

providing a fiber optic cable with at least one optical fiber, a cable jacket that houses the optical fiber, a first strength member, and a second strength member;

providing a collar including an inner portion formed from a conductive material and an outer portion formed from a dielectric material, the inner portion seated within the outer portion, wherein the inner portion comprises an outer axial end that is recessed within a cavity of the outer portion and the inner portion defines an axial slot with opposite radial end portions and a central portion located between the opposite radial end portions, the collar further including a radial opening providing radial access to the axial slot;

positioning each of the first strength member and the second strength member within a respective one of the opposite radial end portions, wherein a first end portion of the optical fiber extends through the collar to protrude from an outer axial end of the collar;

crimping the opposite radial end portions of the inner portion to attach the first strength member and the second strength member to the respective one of the opposite radial end portions, wherein the radial opening facilitates the crimping;

attaching a connector housing to the collar, wherein the outer portion of the collar electrically insulates the inner portion of the collar from the connector housing; and providing a cable boot for attaching the connector housing to the collar.

13. The method of claim 12, further including attaching the optical fibers to a total internal reflection block.

14. The method of claim 12, further including interfacing the first end portion of the optical fiber with an active component.

15. The method of claim 12, wherein the sub-assembly forms a portion of an active optic cable assembly.

16. The method of claim 12, further including attaching an end cap or cable boot having a transparent or translucent portion.

17. A fiber optic cable sub-assembly comprising:
a fiber optic cable including at least one optical fiber, a cable jacket that houses the optical fiber, a first strength member, and a second strength member;
a collar including an inner portion formed from a conductive material and an outer portion formed from a dielectric material, the inner portion comprising an outer axial end that is recessed within a cavity of the outer portion, wherein:
the inner portion defines an axial slot with opposite radial end portions and a central portion located between the opposite radial end portion,
the collar further includes a radial opening providing radial access into the axial slot,
each strength member is disposed within a respective one of the opposite radial end portions of the axial slot, and
the at least one optical fiber extends through the central portion of the axial slot of the collar such that the at least one optical fiber is disposed between the first strength member and the second strength member;
a connector housing attached to the collar, wherein the outer portion of the collar electrically insulates the inner portion of the collar from the connector housing; and
a cable boot for attaching the connector housing to the collar,
wherein the radial opening provides a window for the at least one optical fiber to bend into the connector housing.

18. The fiber optic cable sub-assembly of claim 17, wherein:
the fiber optic cable comprises a cable jacket comprising an internal passage, a first end, and a second end;
the first strength member and the second strength member extend continuously along an entire length of the cable jacket from the first end to the second end;
the internal passage receives the at least one optical fiber; and
the first strength member is symmetrically positioned at an opposite side of the internal passage of the cable jacket relative to the second strength member.

19. The fiber optic cable sub-assembly of claim 18, wherein:
the first strength member and the second strength member each comprise an end portion; and
the inner portion is rigidly attached to the end portion of the first strength member and the end portion of the second strength member at the opposite radial end portions.

* * * * *